(12) United States Patent
Berner et al.

(10) Patent No.: US 12,713,152 B2
(45) Date of Patent: Aug. 18, 2026

(54) SENSOR DEVICE AND METHOD FOR OPERATING A SENSOR DEVICE

(71) Applicant: Sony Semiconductor Solutions Corporation, Atsugi (JP)

(72) Inventors: Raphael Berner, Stuttgart (DE); Christian Peter Brändli, Stuttgart (DE); Mojdeh Mohajerani, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 0 days.

(21) Appl. No.: 18/719,386

(22) PCT Filed: Nov. 28, 2022

(86) PCT No.: PCT/EP2022/083487

§ 371 (c)(1), (2) Date: Jun. 13, 2024

(87) PCT Pub. No.: WO2023/117315

PCT Pub. Date: Jun. 29, 2023

(65) Prior Publication Data

US 2025/0056136 A1 Feb. 13, 2025

(30) Foreign Application Priority Data

Dec. 20, 2021 (EP) .................................... 21215926

(51) Int. Cl.
*H04N 25/707* (2023.01)
*H04N 25/47* (2023.01)

(52) U.S. Cl.
CPC ........... *H04N 25/707* (2023.01); *H04N 25/47* (2023.01)

(58) Field of Classification Search
CPC ...... H04N 25/707; H04N 25/47; H04N 25/75; H04N 25/701; H04N 25/445; H04N 25/702; H04N 25/443
See application file for complete search history.

(56) References Cited

U.S. PATENT DOCUMENTS 10,567,679 B2 2/2020 Berner et al.
11,563,909 B1 * 1/2023 Chen ...................... H04N 25/75
(Continued)

FOREIGN PATENT DOCUMENTS

EP 3506622 A1 7/2019
WO 2023/001916 A1 1/2023

OTHER PUBLICATIONS

International Search Report and Written Opinion mailed on Feb. 24, 2023, received for International Application No. PCT/EP2022/083487, filed on Nov. 28, 2022, 10 pages.

*Primary Examiner* — Yogesh K Aggarwal
(74) *Attorney, Agent, or Firm* — XSENSUS LLP

(57) ABSTRACT

A sensor device comprises a plurality of sensor units each of which being capable to detect an intensity of an influence on the sensor unit, and to detect as an event a positive or negative change of the intensity of the influence that is larger than a respective predetermined threshold, a filter unit configured to randomly select for readout a part of the events that were detected by the plurality of sensor units during at least one predetermined time period, a memory unit configured to store history data of detected events and/or of readout selection operations of the filter unit, and an output interface configured to receive and output the selected part of the events from the filter unit for each of the at least one predetermined time periods.

14 Claims, 18 Drawing Sheets

(56) References Cited

U.S. PATENT DOCUMENTS

| | | | |
|---|---|---|---|
| 2016/0078321 | A1 | 3/2016 | Wang et al. |
| 2020/0372254 | A1* | 11/2020 | Laveau .................. G06V 20/30 |
| 2020/0410272 | A1 | 12/2020 | Seo et al. |
| 2022/0070392 | A1 | 3/2022 | Izawa |

* cited by examiner

S101
S102
S103
S104
No
Yes
S105
No
Yes
S106
S107
S108
S109
Yes
No
S110
S111
Yes
No
S112

S301
S302
S303
No
S306
Yes
S304
S307
No
S308
Yes
S305
No
Yes
S309

Controller
120
Pixel 111
PR
Sample signal
A1
Vb
Vcomp
Memory
Event
310
Vdiff
PRC
Vpr
340
C1
350
Iphoto
380
Reset Circuit
R1
PD
Global reset
9
300

Figure 13C:
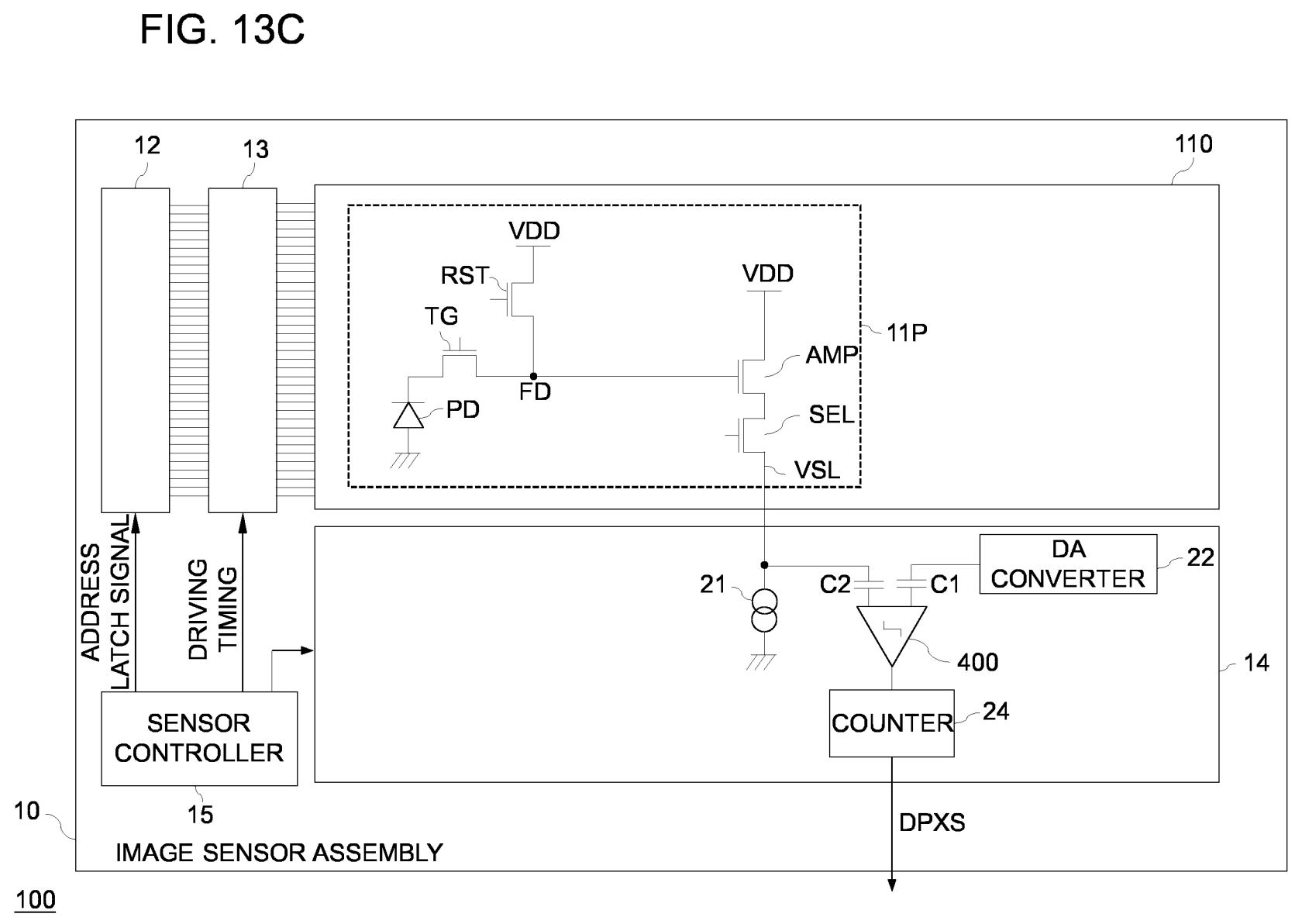

FIG. 13C 100
10
IMAGE SENSOR ASSEMBLY
110
11P
VDD
RST
TG
PD
FD
VDD
AMP
SEL
VSL
14
22
DA CONVERTER
C1
C2
400
24
COUNTER
DPXS
21
12
13
15
SENSOR CONTROLLER
DRIVING TIMING
ADDRESS LATCH SIGNAL

Figure 16:
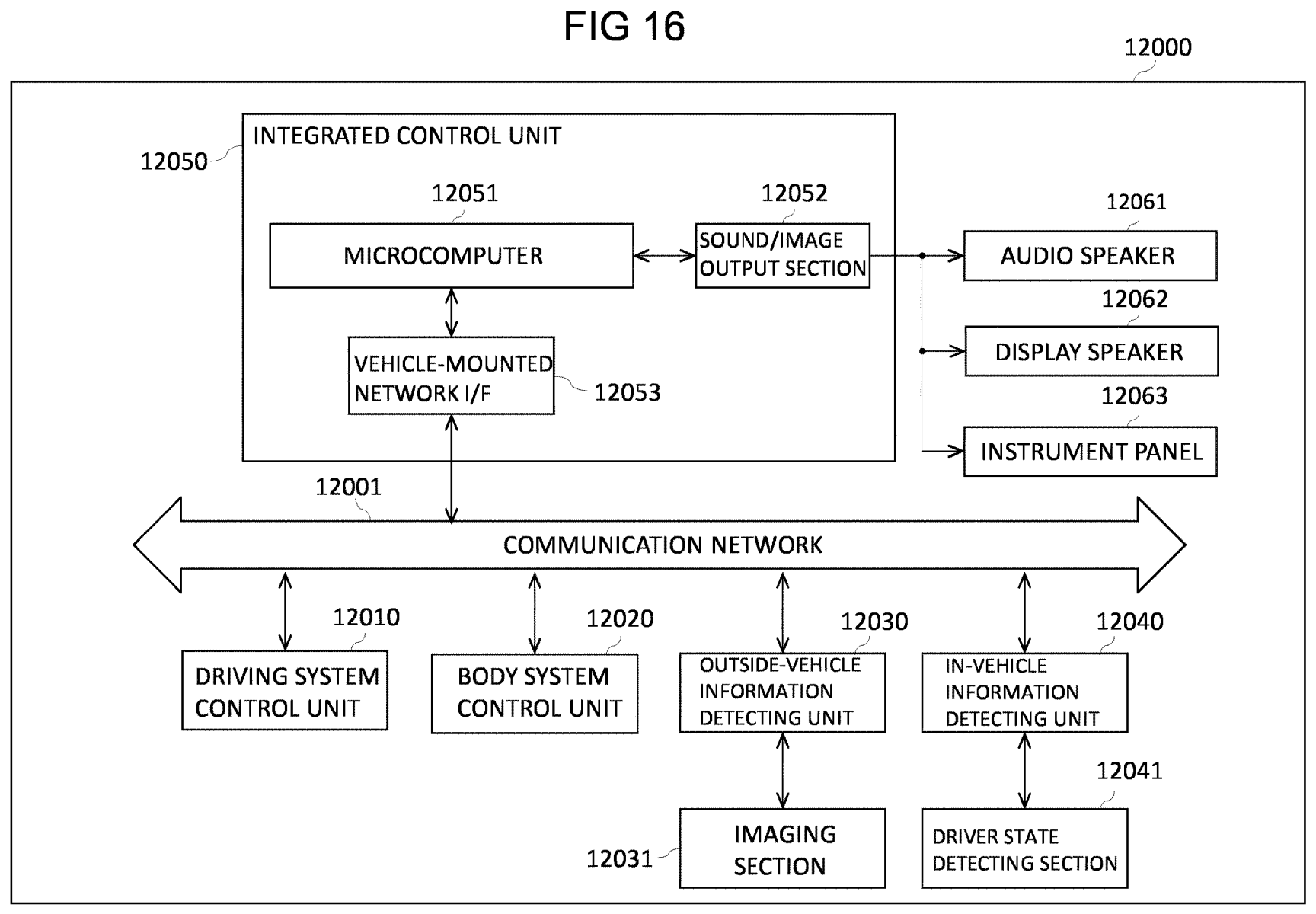

INTEGRATED CONTROL UNIT 12050

MICROCOMPUTER 12051

SOUND/IMAGE OUTPUT SECTION 12052

VEHICLE-MOUNTED NETWORK I/F 12053

AUDIO SPEAKER 12061

DISPLAY SPEAKER 12062

INSTRUMENT PANEL 12063

COMMUNICATION NETWORK 12001

DRIVING SYSTEM CONTROL UNIT 12010

BODY SYSTEM CONTROL UNIT 12020

OUTSIDE-VEHICLE INFORMATION DETECTING UNIT 12030

IMAGING SECTION 12031

IN-VEHICLE INFORMATION DETECTING UNIT 12040

DRIVER STATE DETECTING SECTION 12041

SENSOR DEVICE AND METHOD FOR OPERATING A SENSOR DEVICE

CROSS-REFERENCE TO RELATED APPLICATIONS

The present application is a national stage application, pursuant to 35 U.S.C. § 371, of International Patent Application No. PCT/EP2022/083487, filed Nov. 28, 2022, which claims priority from European Patent Application No. 21215926.3, filed Dec. 20, 2021, the entire contents of each are incorporated herein by reference.

FIELD OF THE INVENTION

The present disclosure relates to a sensor device that is capable of event detection and a method for operating the same. In particular, the present disclosure is related to the field of event detection sensors reacting to changes in light intensity, such as dynamic vision sensors (DVS).

BACKGROUND

Computer vision deals with how machines and computers can gain high-level understanding from digital images or videos. Typically, computer vision methods aim at excerpting, from raw image data obtained through an image sensor, that type of information the machine or computer uses for other tasks.

Many applications such as machine control, process monitoring or surveillance tasks are based on the evaluation of the movement of objects in the imaged scene. Conventional image sensors with a plurality of pixels arranged in an array of pixels deliver a sequence of still images (frames). Detecting moving objects in the sequence of frames typically involves elaborate and expensive image processing methods.

Event detection sensors like DVS tackle the problem of motion detection by delivering only information about the position of changes in the imaged scene. Unlike image sensors that transfer large amounts of image information in frames, transfer of information about pixels that do not change may be omitted, resulting in a sort of in-pixel data compression. The in-pixel data compression removes data redundancy and facilitates high temporal resolution, low latency, low power consumption, and high dynamic range with little motion blur. DVS are thus well suited especially for solar or battery powered compressive sensing or for mobile machine vision applications where the motion of the system including the image sensor has to be estimated and where processing power is limited due to limited battery capacity. In principle the architecture of DVS allows for high dynamic range and good low-light performance.

However, vision event detection sensors like DVS, but also event-based sensors of any other type, like e.g. auditory sensors, tactile sensors, chemical sensors and the like, can produce very large amounts of event data. This results in large throughput and therefore in queuing and processing delays together with increased power consumption. In fact, for a large data amount, i.e. for a large amount of events, the data output will not be sparse, which counteracts the positive characteristics of event-based sensors.

It is therefore desirable to utilize and pushing further the high temporal resolution of event-based sensors, in particular of photoreceptor modules and image sensors adapted for event detection like DVS.

SUMMARY OF INVENTION

While event detection provides the above mentioned advantages, these advantages might be reduced for large amounts of events. For example, a large number of events may result in increased power consumption. Further, large peaks of output data generated by large amounts of events will introduce latency and deteriorate the real-time behavior of the system. The present disclosure mitigates such shortcomings of conventional event detection sensor devices.

To this end, a sensor device is provided that comprises a plurality of sensor units each of which being capable to detect an intensity of an influence on the sensor unit, and to detect as an event a positive or negative change of the intensity of the influence that is larger than a respective predetermined threshold, a filter unit configured to randomly select for readout a part of the events that were detected by the plurality of sensor units during at least one predetermined time period, a memory unit configured to store history data of detected events and/or of readout selection operations of the filter unit, and an output interface configured to receive and output the selected part of the events from the filter unit for each of the at least one predetermined time period. Here, the filter unit is configured to perform the random selection repeatedly for a series of the at least one predetermined time periods based on the history data.

Further, a method for operating a sensor device as described above is provided, the method comprising: detecting events with the plurality of sensor units; randomly selecting for readout a part of the events that were detected by the plurality of sensor units during at least one predetermined time period; storing history data of detected events and/or of readout selection operations; and outputting the selected part of the events for each of the at least one predetermined time periods. Here, the random selection is performed repeatedly for a series of the at least one predetermined time periods based on the history data.

Sparse event data which is produced in high amounts loses its sparsity properties and advantages. To mitigate this, the above described additional filtering of the event data is introduced to further reduce the data while retaining important features. In particular, it has shown that a randomized selection is an efficient way of representing information. Randomly selected samples can capture important details which can still be correctly interpreted after output. The sensor devices and methods of the present disclosure can therefore effectively deal with the situation of large amount of events in order to ensure real-time operation also for limited processing rates. Accordingly, the advantages of event-based sensors, in particular their high temporal resolution, can also be used for complex situations that produce a large amount of events.

BRIEF DESCRIPTION OF THE DRAWINGS

FIG. 13C is a simplified block diagram of the imaging signal read-out circuitry of the solid state imaging device of FIG. 13A.

FIG. 16 is a block diagram depicting an example of a schematic configuration of a vehicle control system.

DETAILED DESCRIPTION

Figure 1:
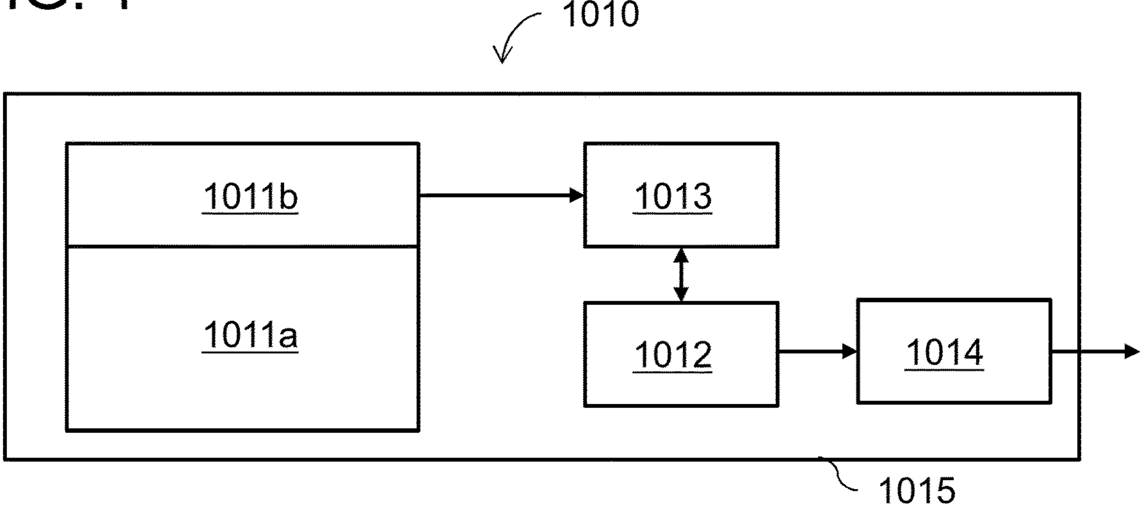
FIG. 1 is a simplified block diagram of a sensor device for event detection.

FIG. 1 shows a simplified block diagram of a sensor device 1010 for event detection that is capable to maintain low latency and low power consumption, even if a large number of events is detected.

The sensor device 1010 comprises a plurality of sensor units 1011*a* that are each capable to detect an intensity of an influence on the sensor unit 1011*a*, and to detect as an event a positive or negative change of the intensity of the influence that is larger than a respective predetermined threshold. Predominant examples for such sensor units 1011*a* are the pixels of a dynamic vision sensor, DVS, that detect as events changes in measured light intensity. However, in principle, any sensor that is capable to detect intensities of any influences such as sound, temperature, pressure or the like can be designed to constitute a sensor unit 1011*a* that is capable to detect events.

The sensor device 1010 further comprises readout circuitry 1011*b* that is configured to read out the detected events, preferably by registering and forwarding an address or other identification of a sensor unit 1011*a* that has detected an event. In addition, the readout circuitry may also register and forward the polarity of the event, i.e. whether the change in intensity was positive or negative, and may even output the measured intensity. The readout circuitry 1011*b* may be additional circuitry or may be formed as part of each of the sensor units 1011*a*.

The events that were detected by the sensor units 1011*a* (or a subset thereof) during at least one predetermined time period are stored in a memory unit 1013 of the sensor device 1010 and then forwarded to a filter unit 1012 of the sensor device 1010. The filter unit 1012 is configured to randomly select for readout a part of the events that were detected during this predetermined time period. This means that not all events registered during the predetermined time period are allowed to be read out, but some of them are randomly dropped. It has been shown that by dropping the event randomly, a reduction of the amount of event can be achieved without an undue deterioration of the information content of the events. This relies on the fact that for a large amount of events, random selection will thin out the number of events without prejudicing a specific spatial or temporal order of the events. Thus, the general pattern of events will remain basically unchanged, however, it will be formed by less events. This reduces latency and power consumption in later processing stages.

In order to be able to decide whether or not a sufficiently large amounts of events has been detected during the predetermined time period for safely applying the random selection, the memory unit 1013 stores history data of detected events and/or of readout selection operations of the filter unit 1012. Based on these history data the filter unit 1012 will perform the random selection, preferably repeatedly for a series of the at least one predetermined time periods. The history data may refer e.g. to the number of events counted in the present or previous predetermined time intervals and allows in this manner an estimation whether the presently detected number of events is larger than an average number of events or a number of events that can be processed. The history data may also refer to how many events were allowed to be read out by the filter unit 1012 or from which sensor units 1011*a* the readout events were detected, i.e. how readout events were distributed over the sensor units 1011*a*. Thus, by basing the random selection on the history data it is ensured that random selection is only carried out if necessary, which prevents a deterioration of the information content in the situation of a sufficiently low number of events.

The events selected for readout are forwarded from the filter unit 1012 to an output interface 1014 of the sensor device 1010, which receives and outputs this selected part of the events for each of the at least one predetermined time periods. The output events can then be processed as is known for common event based sensors.

As illustrated in FIG. 1, the plurality of sensor units 1011*a* (including the readout circuitry 1011*b*), the filter unit 1012, the memory unit 1013, and the output interface 1014 may all be part of a single sensor chip 1015. This sensor chip 1015 can for example replace commonly known chips for event detection, but provides the advantage that the number of events output by the sensor chip 1015 remains at a level that can be processed with low latency and without excessive power consumption. Thus, usage of the sensor chip 1015 in a sensor device 1010 instead of a commonly known chip leads to a reduction of latency and of power consumption. This in turn allows extended battery lifetime or usage of smaller batteries. Further, due to the reduced latency the sensor device 1010 is also well suited for real-time applications in environments with a large amounts of stimuli as in smart phone or head mounted display applications or within autonomously driving cars.

Figure 2:
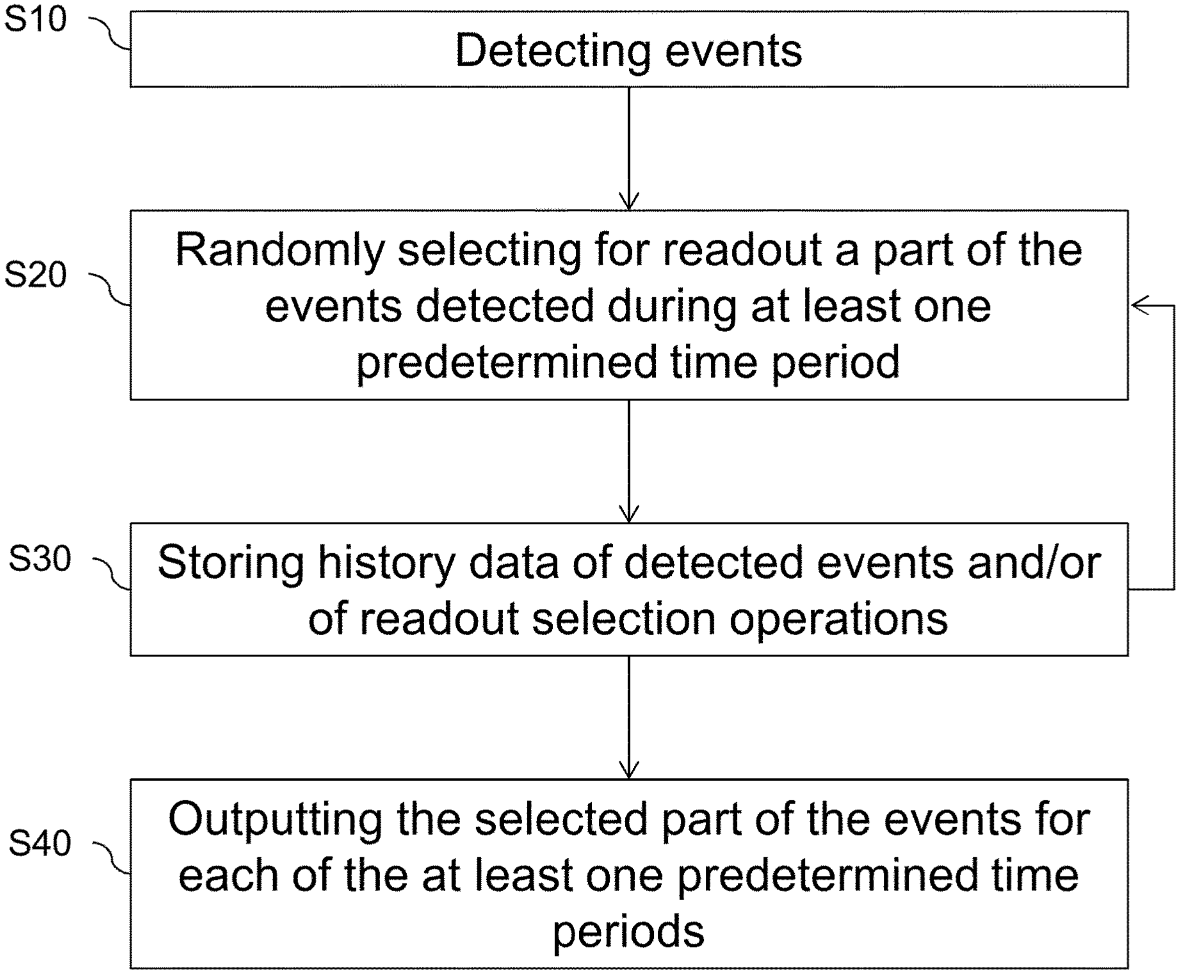
FIG. 2 is a schematic process flow of a method for operating a sensor device for event detection.

The operating principle of the sensor device 1010 is shown as a schematic flow chart in FIG. 2. At S10 events are detected with the plurality of sensor units 1011*a*. At S20 a part of the events that were detected by the plurality of sensor units 1011*a* during at least one predetermined time period are randomly selected for readout. At S30 history data of detected events and/or of readout selection operations are stored, based on which history data the random selection is performed repeatedly for a series of the at least one predetermined time periods. At S40 the selected part of the events are output for each of the at least one predetermined time periods.

Figure 3:
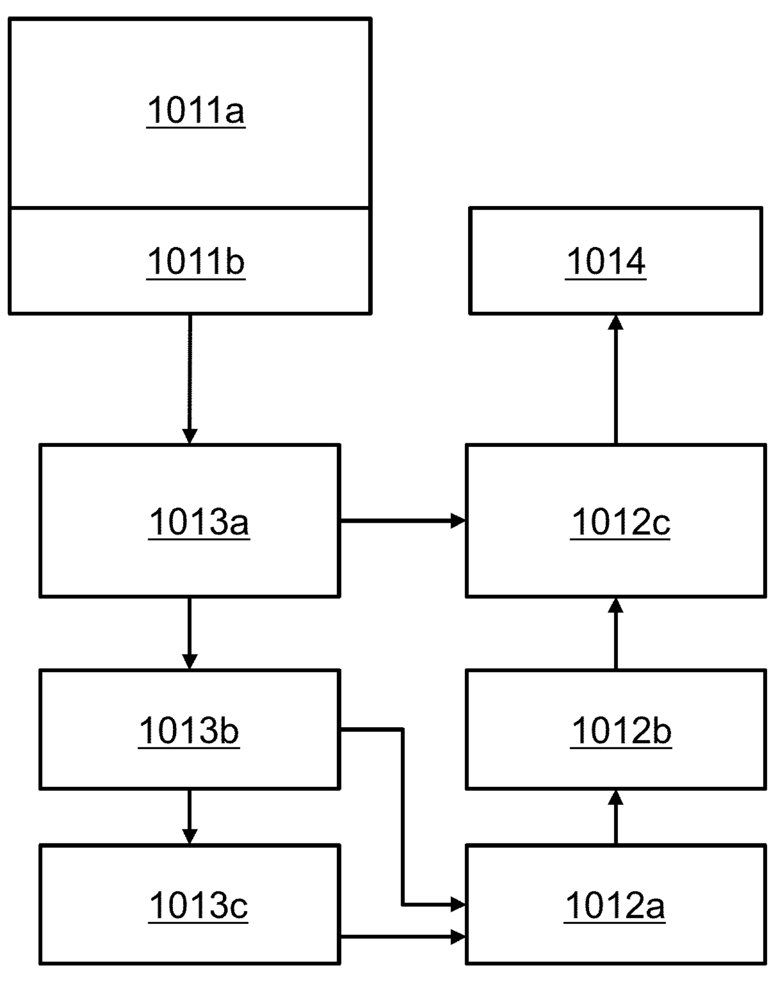
FIG. 3 is a simplified block diagram of another sensor device for event detection.

FIG. 3 illustrated in a schematic block diagram an example for the basic internal structure of the memory unit 1013 and the filter unit 1012. The memory unit 1013 comprises in this example a buffer unit 1013*a*, an event count register 1013*b* and a threshold register 1013*c*. In the buffer unit 1013 the unfiltered events that were output by the readout circuitry 1011*b* are intermediately stored before randomly selecting the events for readout therefrom. Storage of events is preferably done by storing addresses or other identifications of the sensor units 1011*a* that detected the events, optionally together with the event polarity and/or the measured intensity. In the event count register 1013*b* the number of buffered events, i.e. the number of detected events, is counted and the counted value is stored for retrieval in the event count register 1013*b*. This event count constitutes history data in this example. The threshold register 1013*c* stores as an event selection threshold a number of events that are desired for readout.

The filter unit 1012 comprises in this example a calculation unit 1012*a*, a random number generator 1012*b*, and an event drop unit 1012*c*. After each predetermined time interval the calculation unit 1012*a* retrieves the count value from the event count register 1013*b* to learn how many events were detected and buffered in the buffer unit 1013*a*. The calculation unit 1012*a* further retrieves the event selection threshold from the threshold register 1013*c*. Based on the count value and the event selection threshold the random number generator 1012*b* is controlled to provide a series of random numbers to the event drop unit 1012*c*, where each random number refers to one of the events stored in the buffer unit 1013*a*. Based on the generated random number the event drop unit 1012*c* decides whether the corresponding event should be dropped or whether it should be forwarded to the output interface 1014. In this manner each event detected during the predetermined time period is subjected to a random selection process. The probability to be selected can be controlled by adjusting the random number generator via history data like the event count value and predetermined conditions like the event selection threshold.

Figure 4:
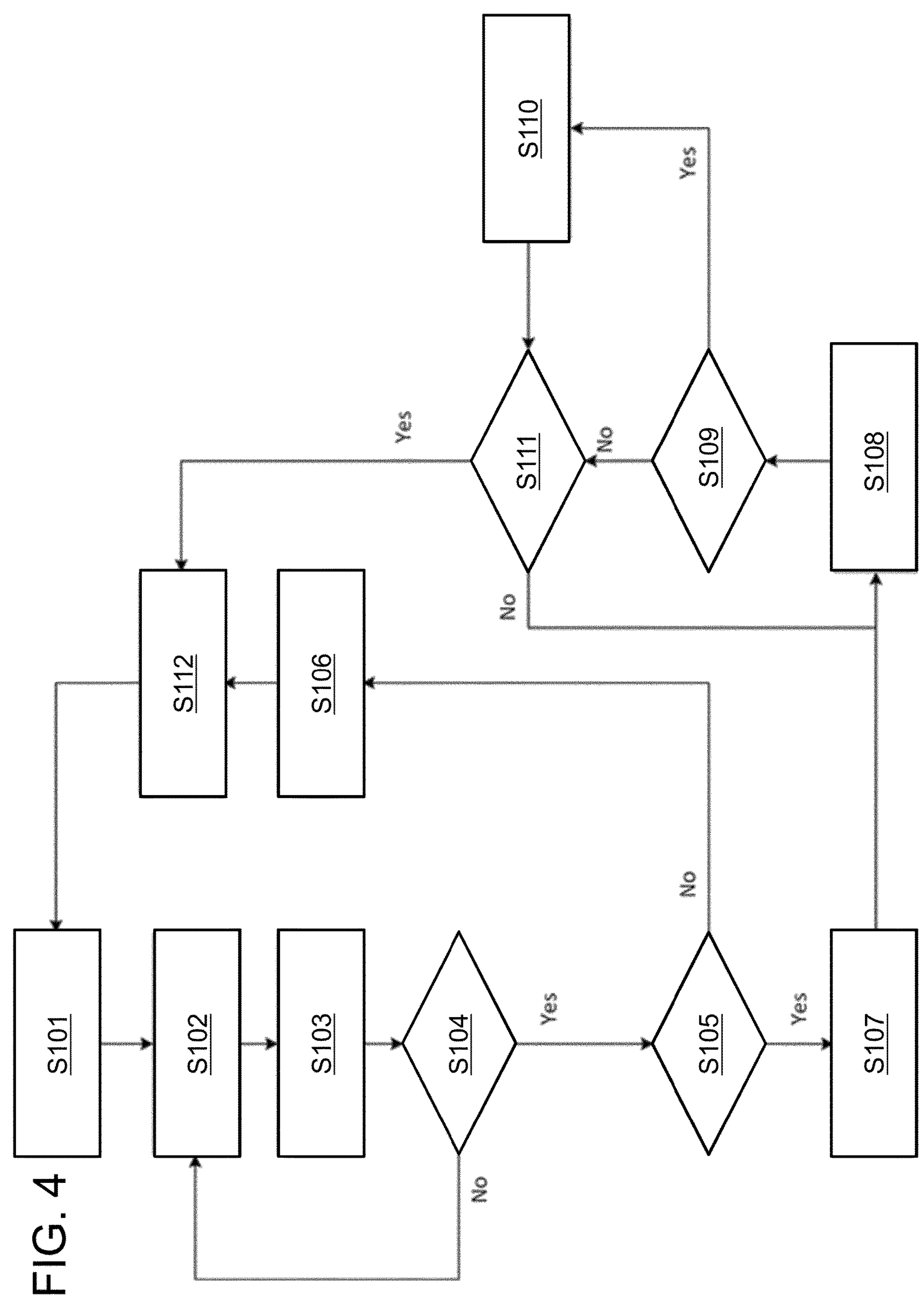
FIG. 4 is a schematic process flow of another method for operating a sensor device for event detection.
Figure 5:
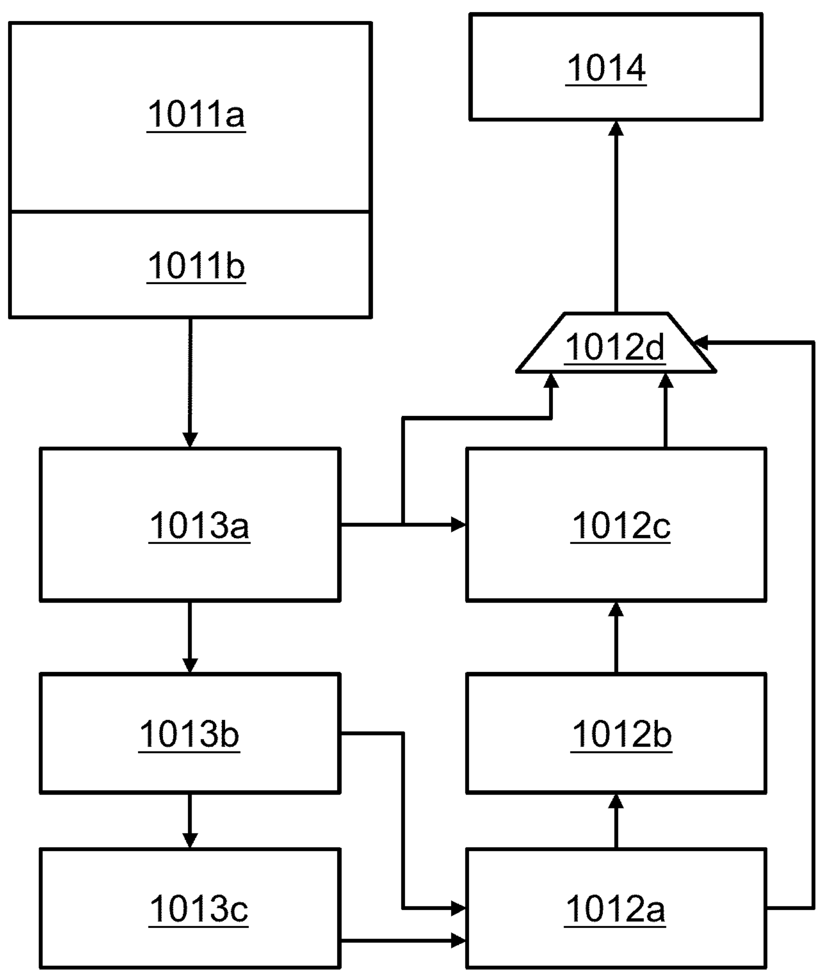
FIG. 5 is a simplified block diagram of another sensor device for event detection.

A particular example for this will be described with respect to FIGS. 4 and 5. FIG. 4 shows a schematic process flow of the random selection, and FIG. 5 shows a schematic block diagram of the corresponding configuration of the sensor device 1010.

As shown in FIG. 4, at S101 the process in initialized by resetting the buffer unit 1013*a* and by setting the event count value to zero. At S102 an event is detected and the event count value is increased by one. At S103 said detected event is stored in the buffer unit 1013*a*. At S104, if not all events in the predetermined time period have been processed, meaning e.g. that the predetermined time period has not yet been finished, the process returns to S102. After the predetermined time period has ended, the process is continued at S105 by comparing in the calculation unit 1012*a* whether the event count value that has been reached is larger than the event selection threshold. If this is not the case, random selection is not necessary and all events are readout from the buffer unit 1013*a* and sent to the output interface 1014 at S106.

If the event count value is larger than the threshold, at S107 to S111 random selection is performed. That is, in the sensor device 1010 the memory unit 1013 stores during each predetermined time period the events and the number of events detected during this predetermined time period as the history data. The filter unit 1012 is configured to compare the stored number of events with an event selection threshold, to carry out the random selection on the events stored in the memory unit 1013, when the stored number of events is larger than the event selection threshold, and to not carry out the random selection on the events stored in the memory unit 1013, when the stored number of events is smaller than the event selection threshold. Thus, it is ensured that random selection is only carried out, if the number of detected events is sufficiently large.

At S107, the calculation unit 1012*a* of the filter unit 1012 sets a probability for forwarding an event out of the stored events to the output interface 1014 as the ratio of the event selection threshold and the stored number of events. At S108 the event drop unit 1012*c* reads one event from the buffer unit 1013*a*. At S109 the random number generator 1012*b* generates a "1" with the probability set at S107, and generates otherwise a "0". If the random number generator 1012*b* generates a "1" at S109, the event is forwarded to the output interface 1014. If not, the event is dropped. At S111 it is checked whether all events from the buffer unit 1013*a* have been processed. If not, the process returns to S108 to select the next event from the buffer unit 1012*a*. If all events buffered in the predetermined time period have been treated, the buffer unit 1012*a* and the event count value are reset at S112, and the processing of the next predetermined time period starts at S101.

As can be seen in FIG. 5, this process can e.g. be carried out by the configuration of FIG. 3, if a multiplexer 1012*d* is added that forwards the entries of the buffer unit 1013*a*, if a positive output is produced by the calculation unit 1012*a* and the event drop unit 1012*c*.

In this manner, latency can be reduced by reducing large number of events by random selection. A further reduction of latency can be achieved, by carrying out random selection of multiple events stored in the memory unit 1013 in parallel. To this end, a plurality of random number generators 1012*b* and of event drop units 1012*c* can be provided that operate in parallel on the events stored in the buffer unit 1013*a*, in order to finish the readout cycle for a single predetermined time period more quickly.

In this example the number of events that are selected and forwarded to the output interface 114 per predetermined time interval fluctuates probabilistic around the event selection threshold. This might be disadvantageous, if the event selection threshold must not be exceeded in further processing steps. In the following a configuration of the sensor device 1010 which mitigates this problem will be discussed with respect to FIGS. 6 and 7.

Figure 6:
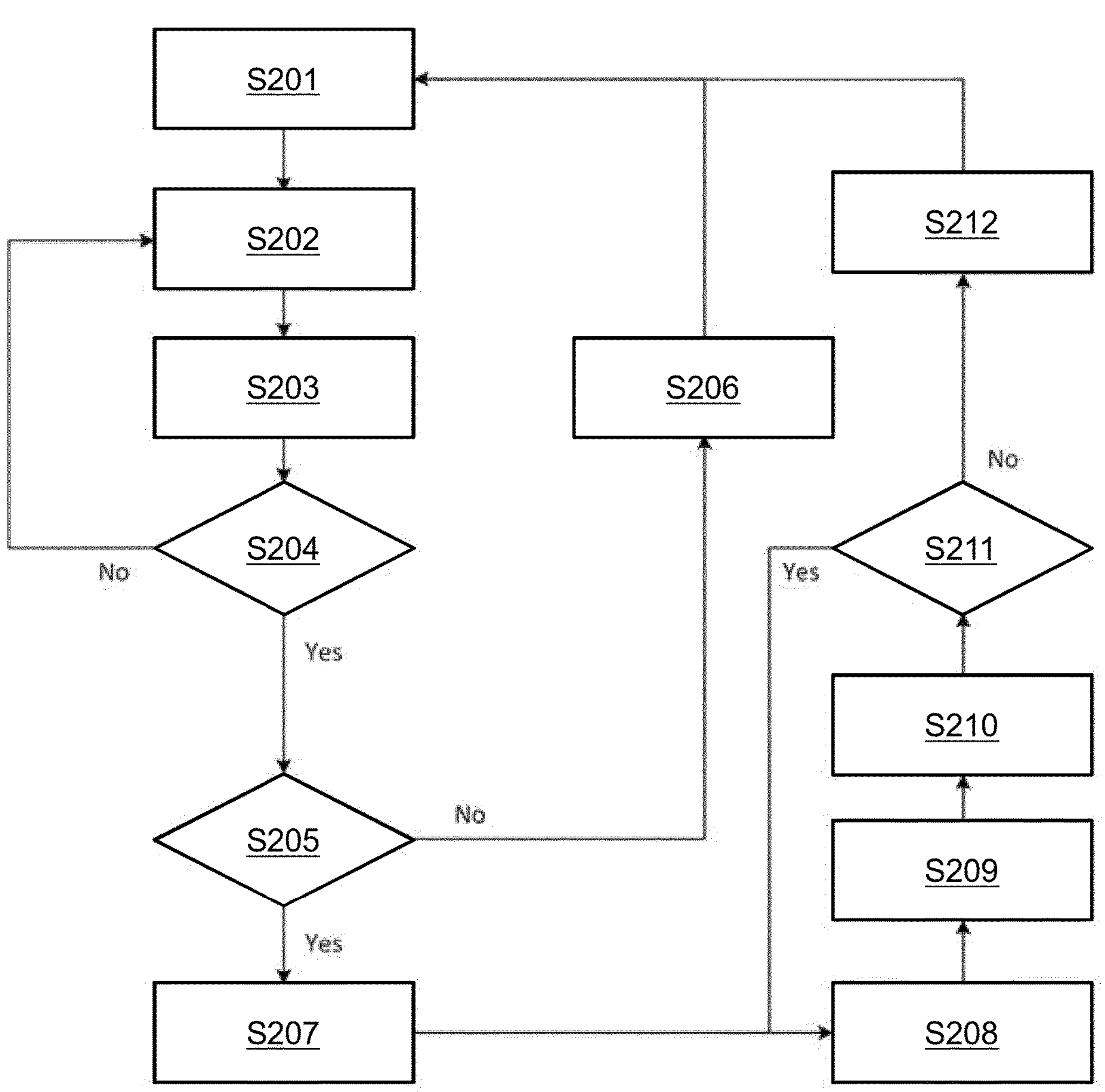
FIG. 6 is a schematic process flow of another method for operating a sensor device for event detection.
Figure 7:
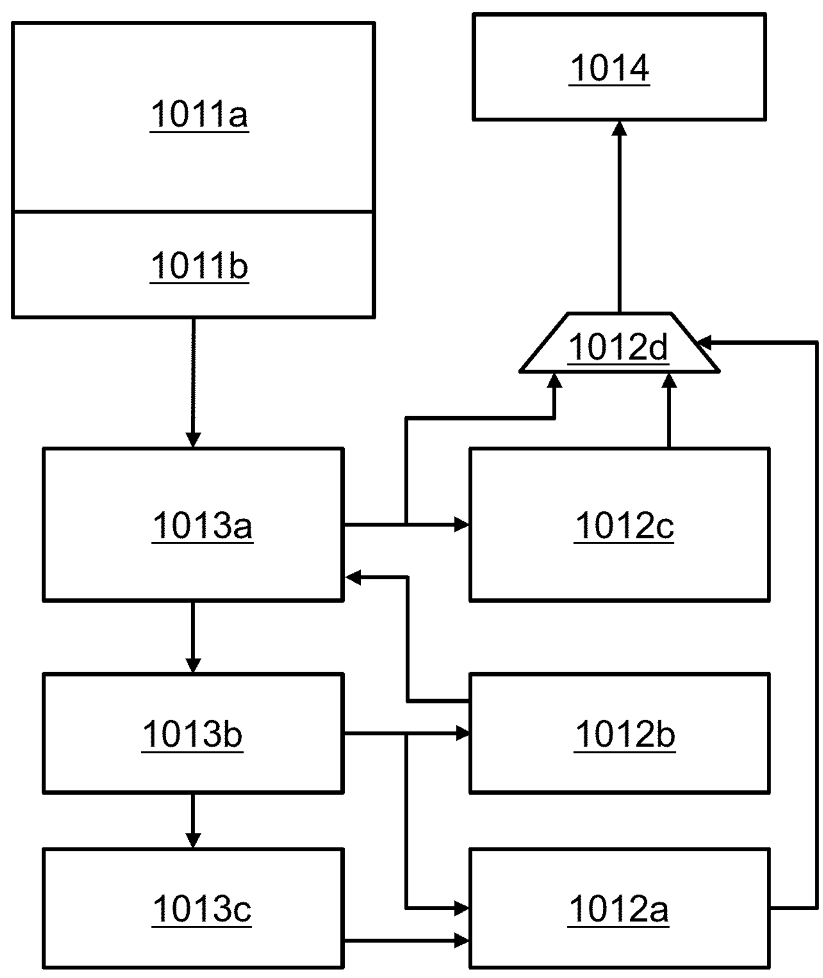
FIG. 7 is a simplified block diagram of another sensor device for event detection.

FIGS. 6 and 7 refer to exemplary configuration of a sensor device 1010 in which the filter unit 1012 carries out random selection by randomly choosing stored events for forwarding to the output interface 1014 without choosing the same stored event twice, by counting the number of forwarded events, and by stopping forwarding of stored events, when the number of forwarded events has reached the event selection threshold. Thus, although random selection is performed, the number of events that is output will be maximally equal to the event selection threshold.

This can be achieved as illustrated in the schematic process flow of FIG. 6. Here steps S201 to S206 are equivalent to steps S101 to S106 described above for FIG. 4. Thus, also here the events detected during one predetermined time period are buffered and counted. If the event count value is smaller than the event selection threshold, all buffered events can be forwarded to the output interface 1014 without the need for random selection.

If at S205 it is found that the number of detected events is larger than the event selection threshold, at S207 a counter for counting the number of events that have been forwarded to the output interface will be set to zero. At S208 the random number generator 1012*b* generates randomly a number between 1 and the event count value, however, without outputting the same number twice before reset. At S209 the number generated by the random number generator 1012*b* is used as a pointer to the address of a corresponding event in the buffer unit 1013*a*. This is possible, since a number of events equal to the event count value is stored in corresponding address spaces of the buffer unit, and since the randomly generated number amounts maximally to the event count number. At S210 the event corresponding to the random number is read out and forwarded to the output interface 1014. At the same time, the counter for the number of forwarded events is increased by one. At S211 it is checked whether this counter is smaller than the event selection threshold. If so, the process returns to step S208. If not, the maximum allowed number of events to be readout has been reached. Then, the random number generator 1012*b* is reset at S212 and the process continues in the next predetermined time period with step S201.

Again, as can be seen from FIG. 7, this process can be carried out by the configuration of the sensor device 1010 shown in FIG. 3 or 5. Here, the multiplexer 1012*d* forwards buffered events from the buffer unit 1013*a* to the output interface, when the calculation unit 1012*a* signals that the event selection threshold has been exceeded, and when the event drop unit 1012*c* signals that the number of already read out events did not exceed the event selection threshold, too.

In the examples described above all events detected during one predetermined time period need to be stored in the buffer unit 1013*a*, which means that in order to deal with a large number of events the buffer unit 1013*a* must be sufficiently large. However, random selection of events can also be performed without this constraint as will be explained below with respect to FIGS. 8 and 9.

Figure 8:
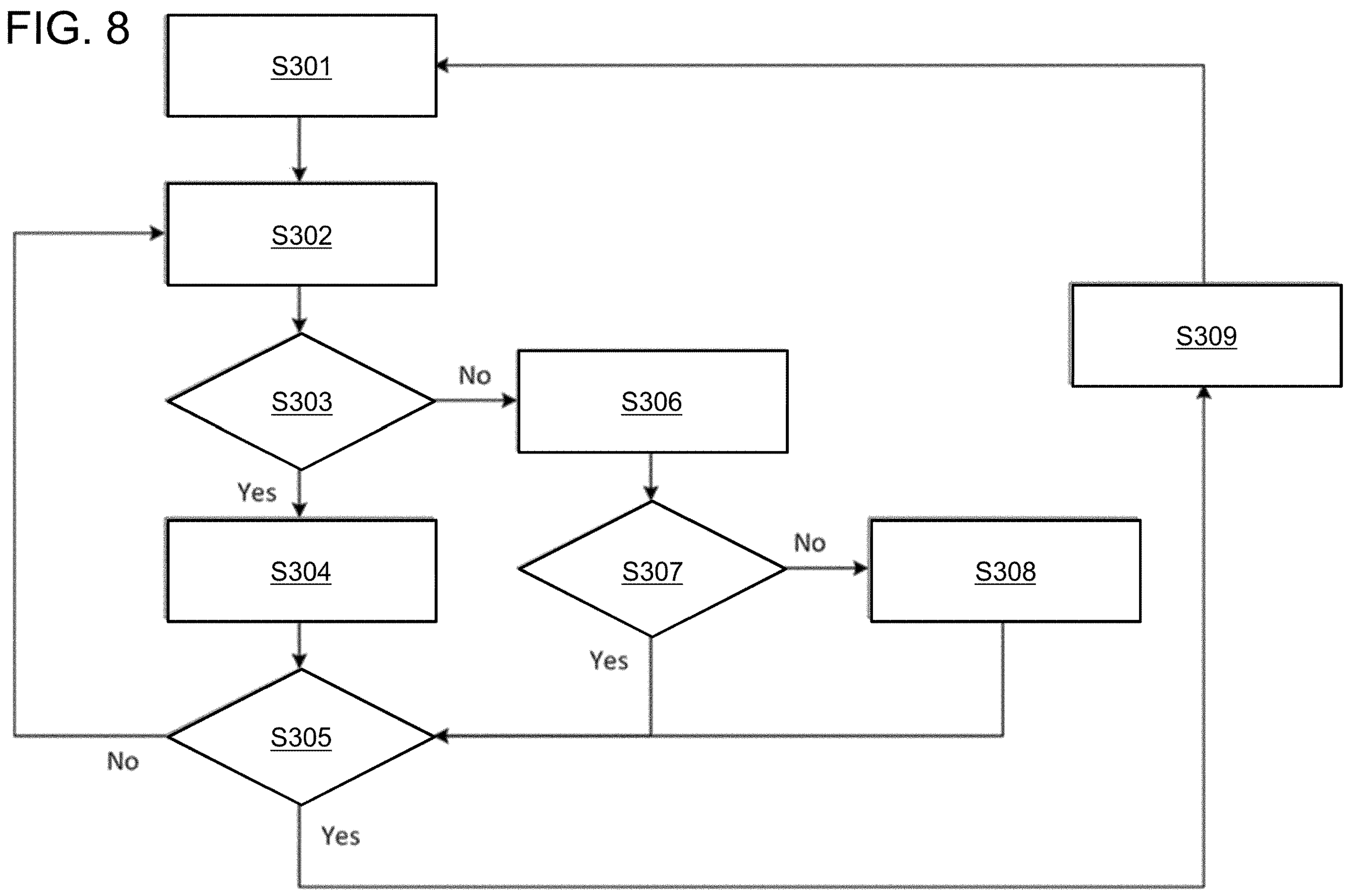
FIG. 8 is a schematic process flow of another method for operating a sensor device for event detection.
Figure 9:
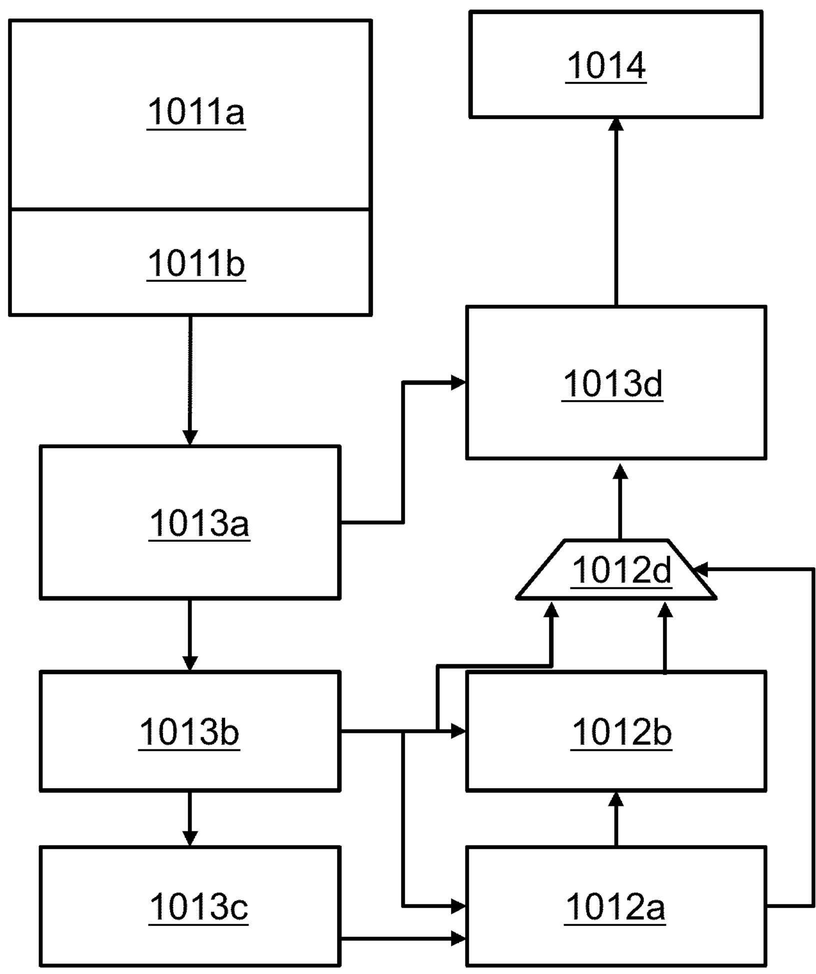
FIG. 9 is a simplified block diagram of another sensor device for event detection.

According to the configuration of FIGS. 8 and 9 the memory unit 1013 has at least one memory space 1013*d* to store a number of N events at the same time. For each predetermined time period the filter unit 1012 stores each newly detected event into the memory space 1013*d* until the number of N events are stored therein, and decides thereafter randomly whether or not to overwrite events stored in the memory space 1013*d* by newly detected events. Thus, the maximum number of entries of the memory space 1013*d* is equal to N, irrespective of the number of detected events. This ensures on the one hand that the memory space 1013*d* of the memory unit 1013 can be restricted to a given size. Further, it ensures that the number of events forwarded to the output interface is restricted to N, since only N events are selected for storage and output in the memory space 1013*d*. N serves therefore as the event selection threshold in this configuration.

FIG. 8 shows an exemplary schematic process flow of this random selection method. Steps S301 to S3303 correspond to steps S101 to S103 of FIG. 4 or steps S201 to S203 of FIG. 6. Here, the detected events are counted, and it is checked whether the event selection threshold has been crossed yet. If not, at S304 the event is stored in the memory space 1013*d*, which has a size N equal to the event selection threshold. At S305 it is then checked whether all events in the current predetermined time period have been treated as was described above for step S104 of FIG. 4.

If the event detection threshold is crossed, this means that the memory space 1013*d* is completely filled with stored events. Then, at S306 the random number generator 1012*b* generates randomly an integer between 1 and the current event count value. At S307 it is checked whether the random number generated in this manner is larger than the event selection threshold, i.e. larger than N. If not, the generated random number is used as a pointer to a corresponding storage location of the memory space 1013*d*, and the event stored therein is overwritten with the newly detected event. If the random number is larger than the number N, the event is discarded. Thus, random selection is carried out in this configuration by deciding on a random basis whether or not events are stored into the memory space 1013*d.*

After this decision has been made, the process returns to step S305 to continue until all events in the present predetermined time interval have been processed. After having processed all events in the present predetermined time interval, all events are forwarded from the memory space 1013*d* to the output interface 1014 as would be the case for a common event sensor without random event selection Thus, for randomly deciding whether or not to overwrite events stored in the memory space the filter unit 1012 is configured to count the number of detected events and to store the counted number in the memory unit 1013 as history data, to generate for each newly detected event a random number between 1 and the momentary number of detected events, to discard the newly detected event, if the random number is larger than the number N, and, if the random number is smaller or equal to N, to overwrite the event stored in the memory space at a position corresponding to the random number.

A possible configuration of the sensor device 1010 that is adapted to the above process is shown in FIG. 9. In this case the event drop unit 1012*c* can be omitted to be replaced with the memory space 1013*d*. The buffer unit 1013*a* can be designed to be of smaller size than in the configurations discussed before. For example, a FIFO buffer with only a few entries may be used as buffer unit 1013*a*, which is just sufficient to store event data of those events for which the decision whether or not to transfer them to the memory space 1013*d* is ongoing. This transfer will only be possible, when the random number from the random number generator 1012*b* is sufficiently small when compared to the event count value provided by the event count register 1013*b*. Further, random selection will only be carried out, if the calculation unit 1012*a* signals that the event count value is larger than the event selection threshold. These conditions are symbolized in FIG. 9 as the input signals of multiplexer 1012*d* which symbolically control transfer of event data from the buffer unit 1013*a* to the memory space 1013*d.*

Thus, large memories can be avoided in the random selection, which further reduces latency. In addition, by using several memory spaces each fed by its own random number generator, it is possible to reduce latency even further, since several events can be processed in parallel.

A further reduction of the needed amount of memory and the latency of processing can be achieved by calculating the probability to drop an event based on the event rate of previous predetermined time intervals. This will be described in the following with respect to FIG. 10.

In this configuration of the sensor device 1010 the memory unit 1013 stores as the history data the number of events detected during the predetermined time periods, and the filter unit 1012 randomly selects events during a current predetermined time period with a probability that depends on the number of detected events of the previous predetermined time period.

Figure 10:
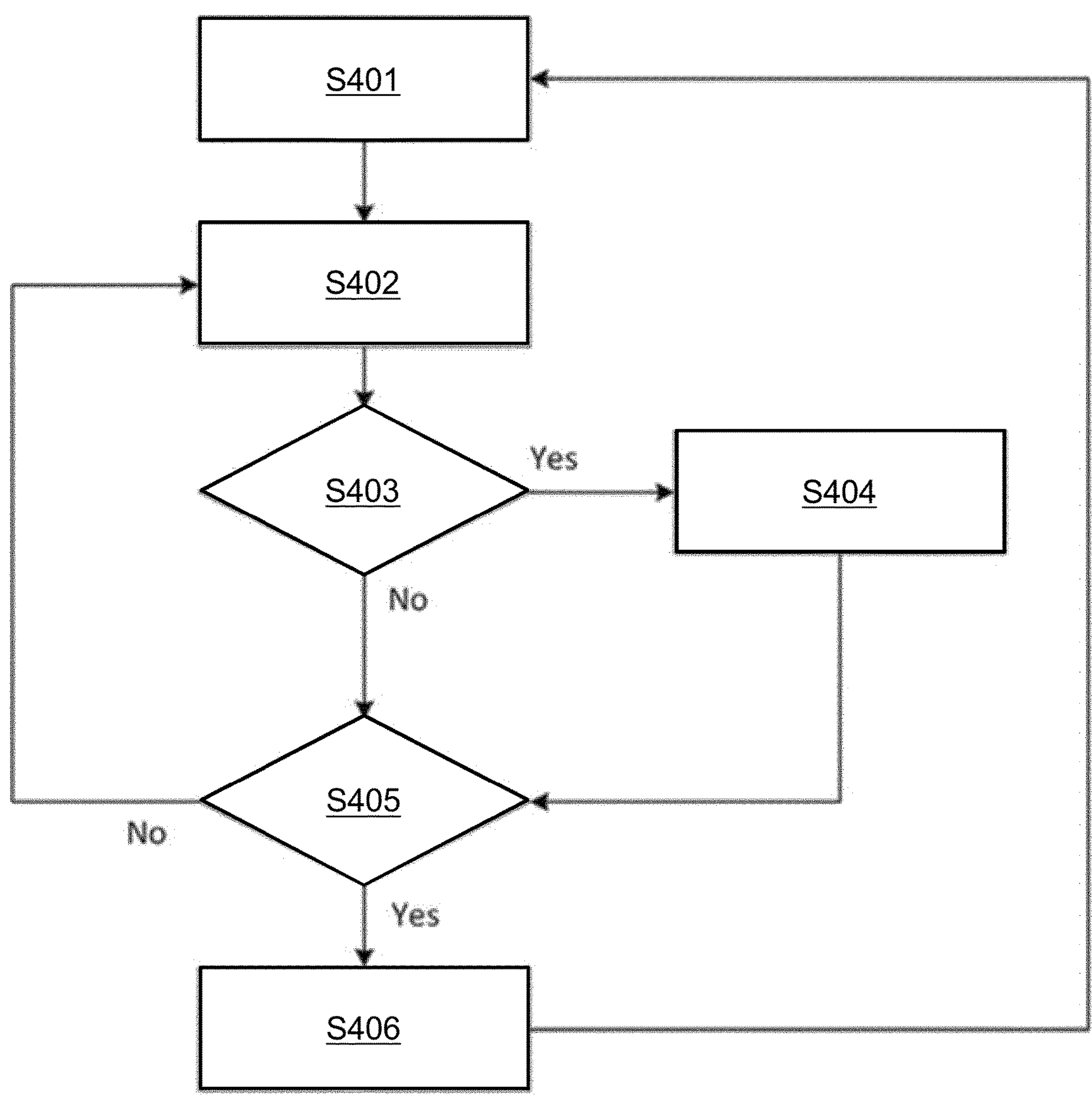
FIG. 10 is a schematic process flow of another method for operating a sensor device for event detection.

As shown in FIG. 10, at S401 the event count value is set to zero and at S402 this event count value is increased for every newly detected event. However, in contrast to the previous configurations, no buffering of the events is performed. At S403 the random number generator 1012*b* generates randomly either "1" or "0" with a probability P that has been set during processing of events of the previous predetermined time period. If a "1" is returned the current event is directly forwarded to the output interface 1014 without buffering at S404. If a "0" is returned the event is dropped.

Then, it is checked at S405 whether all events detected during the predetermined time period have been detected, which might be equivalent with checking whether the current predetermined time period has ended. As long as this check is negative S402 to S404 are repeated for each newly detected event. Once all events of the present predetermined time period have been processed, the probability P for the next predetermined time period is set at S406 before the process returns to S401 for processing the events of this next predetermined time period.

The value of P may depend e.g. on an event selection threshold, an event count value of one or several previous predetermined time intervals and/or on the probabilities P used during one or several previous predetermined time intervals. For example, P may be equal to a ratio between an event selection threshold and the event count value of the previous predetermined time interval: $P(T)=\text{Threshold}/\text{EvtCnt}(T-1)$. This might e.g. be modified by a term reflecting the probability used before: $P(T)=a\ P(T-1)+b\ \text{Threshold}/\text{EvtCnt}(T-1)$, with a and b (adjustable or fixed) parameters. However, in principle any function that is based on the event selection threshold and the event count value of the previous predetermined time period could be used to determine the probability P.

In the previous configurations the assumption was that all events detected by all sensor units 1011*a* during a predetermined time period could be processed at once. However, if there are memory constraints, e.g. through limitation of space on the chip, this might not be possible. In this case, the sensor units 1011*a* can be divided into blocks or groups and random selection of events can be performed block/group wise. This will be described below with respect to FIG. 11.

In this configuration the sensor units 1011*a* are divided into groups of sensor units, each containing preferably the same number of sensor units 1011*a*, and the filter unit 1012 separately carries out random selection of the detected events for each group of sensor units 1011*a*. For example, if the sensor units 1011*a* are constituted by imaging pixels, each group may be formed by one or several pixels rows or by a block of n×n imaging pixels. Memory needs only be provided for the events detected in one of the sensor unit groups, thereby allowing reducing the size of the memory in comparison to an approach that deals with all sensor units 1011*a* at once.

The memory unit 1013 may store as the history data the total number of events detected during the predetermined time periods as well as the number of events detected within each of the groups of sensor units 1011*a*. Thus, the total number of events is counted as well as the number of events within each group. Then, the filter unit 1012 may determine the probability for randomly selecting an event detected in one specific group in a current predetermined time period based on the total number of events and the number of events counted for the specific group in the previous predetermined time period. Thus, random selection can be adapted to each of the sensor unit groups based on the total number of events and the number of events in the respective sensor unit group. This allows thinning out events in clusters of the sensor units 1011*a* that produce temporarily many events, while other groups of sensor units 1011*a* generate lesser events and are therefore not subjected to random selection. This makes the selection process more flexible.

The filter unit 1012 may assign to each group of sensor units 1011*a* a desired number of events to be read out from the respective group, and carries out random selection with a probability that is based on the assigned desired number. Thus, it can be ensured that every group of sensor units 1011*a* produces roughly a predetermined number of events for read out. This simplifies the layout of following circuitry, since the circuitry can be designed specifically for the expected number of readout events.

Figure 11:
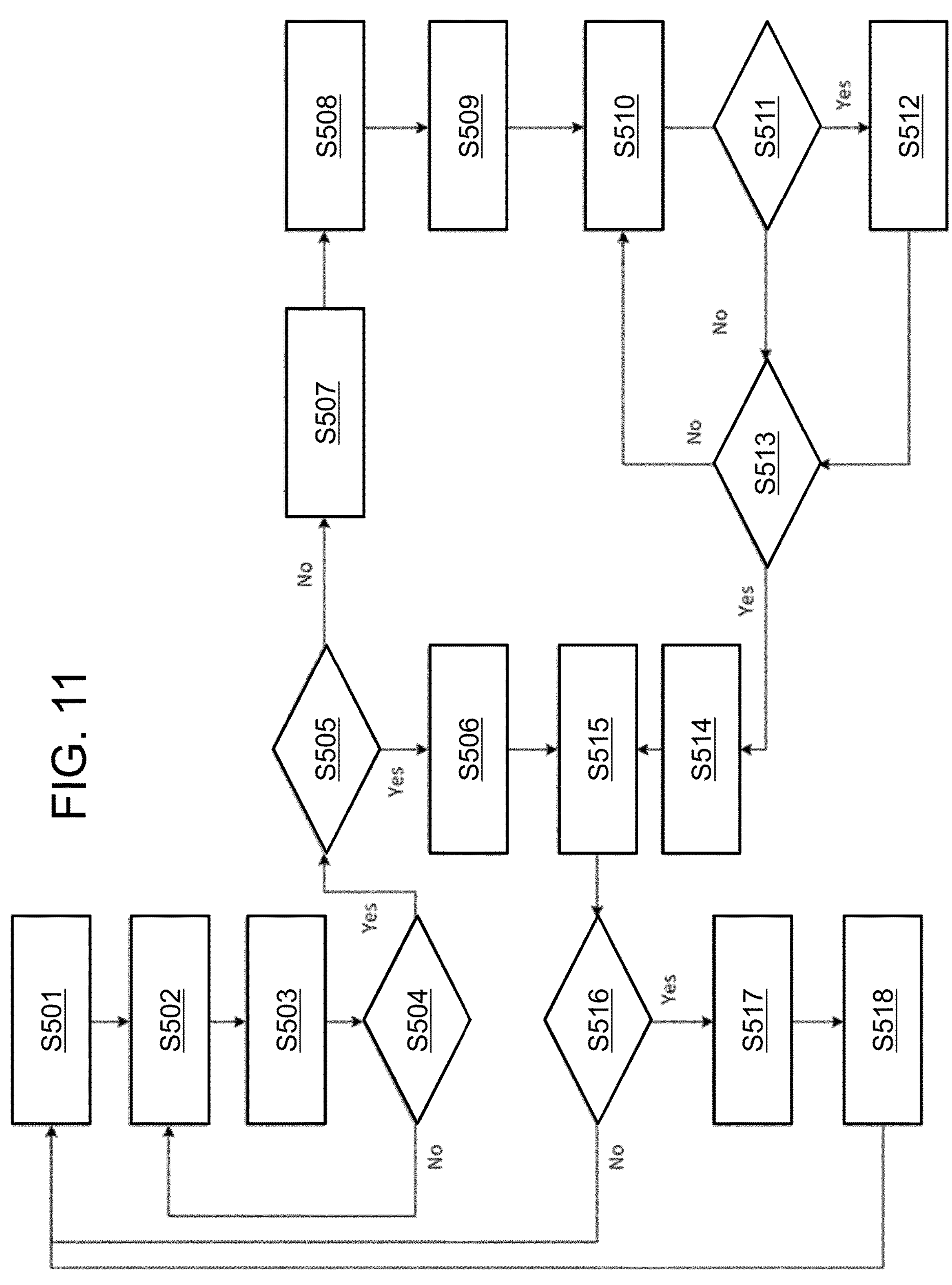
FIG. 11 is a schematic process flow of another method for operating a sensor device for event detection.

The above can for example be implemented as illustrated in FIG. 11. Here, at S501 the process is initialized by setting for a currently processed sensor unit group a group event count value to zero. At S502 the group event count value is increased by one, when an event is detected in the sensor unit group. Also, a global event count value, indicating the number of all events detected by all sensor units 1011*a* is increased at S502. At S503 the detected event is stored in buffer unit 1013*a*. Here the memory unit 1013 may use one buffer unit 1013*a* for consecutively storing the events generated in the different groups. This means that the buffer unit 1013*a* must only be sufficiently large to deal with the events from a single sensor unit group. Memory space can be saved in this manner.

At S504 it is checked whether all events detected in the current sensor unit group have been buffered. If not, the process returns to S502. If so, it is checked at S505 whether the group event count value is smaller than a base budget of events assigned to the currently processed sensor unit group. If the group event count value is smaller or equal to the base budget, the buffered events are forwarded to the interface unit 1014 at S506 and the process continues at S515.

If more events than the base budget have been detected in the currently processed group, at S507 the event activity determined for the currently processed group during the previous predetermined time period is retrieved from the memory unit 1013. The event activity basically indicates how many events were expected to occur based on the history of event detection of the sensor unit group. It might be equal to the number of events detected in the sensor unit group during the previous predetermined time period. It might also be equal to a minimum of this number of detected events and a cap value, which ensures that the entire budget for event output is not spent for a single sensor unit group.

At S508 a dynamic event selection threshold is calculated that might depend on the event activity, the base budget, and a total event activity, which is defined in the same manner as the event activity, but for all sensor units 1011*a*. For example, the dynamic event selection threshold, EvtBgt, may depend on the base budget, BaseBgt, the event activity, BlkActivity, and the total event activity, HistActivity in the following manner:

$$EvtBgt = BaseBgt + C\ BlkActivity/HistActivity,$$

with C a constant. Thus, for each predetermined time period a new event selection threshold is assigned to each of the sensor unit groups, which is the sum of a constant base budget and a weighted ratio of the local event activity to the global event activity.

At S509 the ratio of the dynamic event selection threshold to the group count value of the currently processed sensor unit group is set as the probability for random selection of an event. At S510 readout of events from the buffer unit 1013*a* is started. At S511 the random number generator 1012*b* generates with the probability determined at S509 a "1" for the readout event, and otherwise "0". If a "0" is generated the event is dropped. If a "1" is generated the event is forwarded to the output interface 1014 at S512. At S513 it is checked whether all events detected during the current predetermined time period in the currently processed sensor unit group have been readout from the buffer unit 1013*a*.

If not, the process returns to S510. If so, the event activity is set to the group event count value at S514. Here, if the group event count value exceeds a predetermined cap, the event activity may also be set to the cap at S514. At S515 the event activity is stored for processing of the sensor unit group in the next predetermined time period. At S16 it is checked, whether all sensor unit groups have been processed. If not, the process returns to S501 to start processing of the next sensor unit group. If for the current predetermined time period all sensor unit groups have been treated, the global event count value is set as the total event activity at S517. At S518 the global event count value is reset to zero and the process returns for processing of the next predetermined time period to S501.

In the configurations described above with respect to FIGS. 4, 10, and 11 the random number generator 1012*b* generates randomly a "1" or a "0" and selects a corresponding event for output, if a "1" is generated. This means that event selection is carried out serially. A further reduction of latency can be obtained by a parallel processing as described below.

In particular, the filter unit 1012 may carry out random selection by grouping all or a subset of events (e.g. the events of 128 sensor units 1011*a*) detected during one predetermined time period into an event vector and by performing a bit-wise logical operation between the event vector and a random vector containing a randomly distributed number of 1s and otherwise 0s. Thus, instead of generating 1s and 0s in a serial manner, when events are retrieved for selection, a random vector is generated that allows carrying out event selection in a single processing step. For example, as bit-wise logical operation a logic AND-operation can be used. In this case, only those events of the event vector ANDed with a "1" will remain, while the other entries will be turned to zero. Thus, after the AND-operation the remaining entries of the event vector can be forwarded to the output interface 1014. It should be noted that it is also possible to group the events of one predetermined time period or one sensor unit group into several event vectors and generate random vectors for each of these event vectors. Further, it should be noted that different bit-wise logical operations can be used to implement the above described behavior of the AND-operation. For example, inputs can be inverted and a logical NOR-operation can be used. Further, inverting just the input of the random vector, an XOR-operation can be used. Thus, any bit-wise logical operation can be used that allows filtering a plurality of events in a single operation.

The random vector will contain a number of 1s that is obtained by multiplying the probability for event selection of the configuration of FIG. 4, 10, or 11 with the overall size of event vector. Further, it is possible to normalize the event vector to a given vector size, meaning that the event vector has a fixed size for all predetermined time periods, and irrespective of the number of detected events. The number of 1s in the random vector is then equal to the vector size times an event budget over the number of entries in the event vector. Here the event budget depends on the specific configuration. It will be the event selection threshold in the configuration of FIGS. 4 and 10 and the dynamic event selection threshold in the configuration of FIG. 11. The number of 1s determined in this manner may be equally distributed in the random vector or may be randomly distributed.

Figure 12:
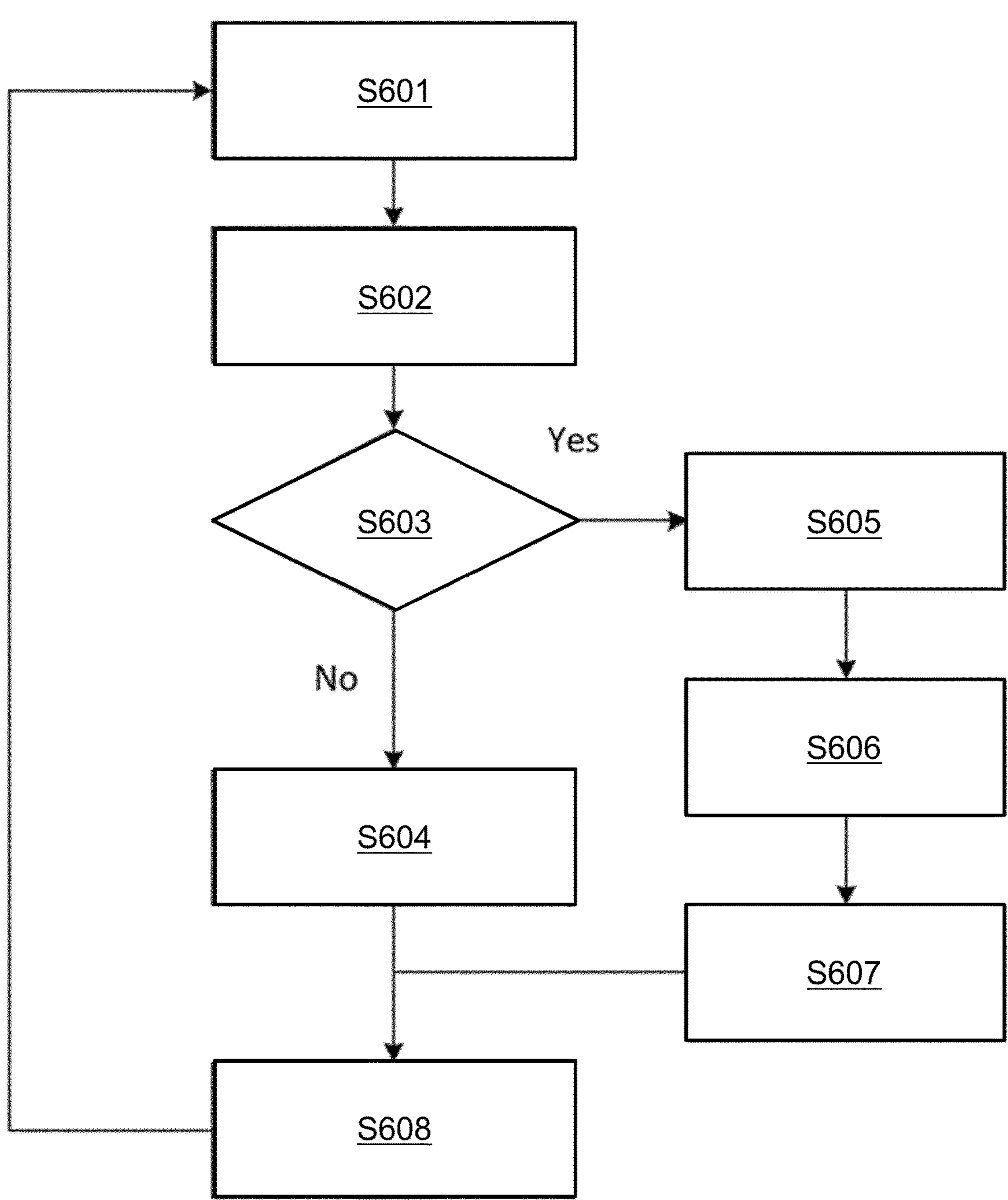
FIG. 12 is a schematic process flow of another method for operating a sensor device for event detection.

FIG. 12 is a schematic process flow of this method. At S601 the event vector is stored, e.g. a vector whose entries correspond to events buffered e.g. in the buffer unit 1013*a*, for example by containing a "1" at a position that can be used as a pointer to an address in the buffer unit 1013 where an event is stored. At S602 the number of non-zero entries of the event vector is calculated, e.g. the number of 1s in the event vector. At S603 it is checked whether this number is larger than the applicable (dynamic) event selection threshold. If not, a vector containing only 1s is generated at S604. If so, the percentage of is in the random vector is calculated at S605 to be the ratio of the applicable (dynamic) event selection threshold and the number of entries of the event vector.

At S606 the random vector is generated by filling the calculated percentage of entries of a vector having the size of the event vector with Is, preferably in an equally distributed manner. Optionally, at S607 the entries of the random vector may be randomly shuffled. At S608 the calculated random vector is ANDed with the event vector and the remaining entries (or the events to which they point) are forwarded to the output interface 1014.

In this manner random selection can be carried out in a highly parallelized manner that ensured reduction of latency.

A particular useful example of a sensor device 1010 as described above can be achieved, if the sensor device 1010 is a solid state imaging device 100, and the sensor units 1011 are imaging pixels 111 arranged in a pixel array 110, each of which being capable to detect as an event a positive or negative change of intensity of light falling on the imaging pixel 111 that is larger than the respective predetermined threshold, i.e. if the sensor device is a DVS, EVS, or the like. The principle functioning of such a solid state imaging device 100 as far as event detection is concerned will be given in the following. Further, useful applications of such a solid state imaging device 100 will be described.

Figure 13A:
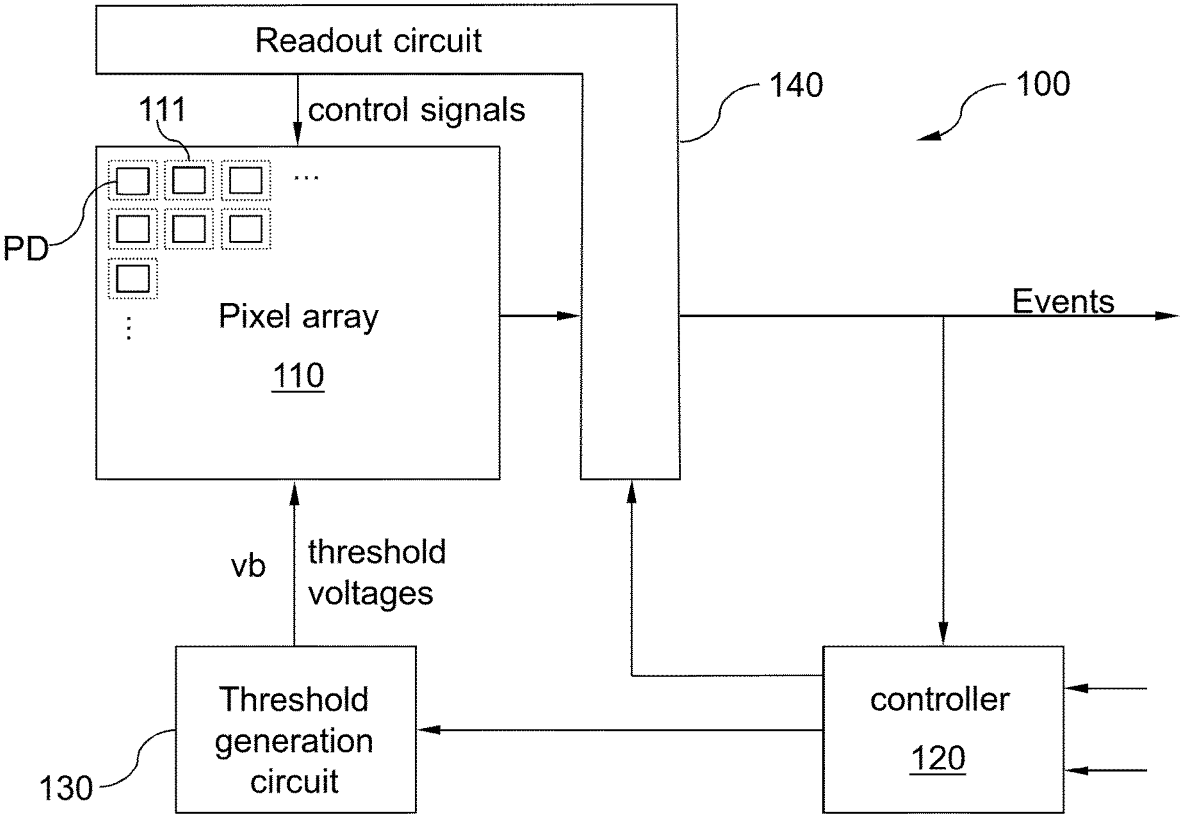
FIG. 13A is a simplified block diagram of the event detection circuitry of a solid-state imaging device including a pixel array.

FIG. 13A is a block diagram of such a solid-state imaging device 100 employing event based change detection. The solid-state imaging device 100 includes a pixel array 110 with one or more imaging pixels 111, wherein each pixel 111 includes a photoelectric conversion element PD. The pixel array 110 may be a one-dimensional pixel array with the photoelectric conversion elements PD of all pixels arranged along a straight or meandering line (line sensor). In particular, the pixel array 110 may be a two-dimensional array, wherein the photoelectric conversion elements PDs of the pixels 111 may be arranged along straight or meandering rows and along straight or meandering lines.

The illustrated embodiment shows a two dimensional array of pixels 111, wherein the pixels 111 are arranged along straight rows and along straight columns running orthogonal the rows. Each pixel 111 converts incoming light into an imaging signal representing the incoming light intensity and an event signal indicating a change of the light intensity, e.g. an increase by at least an upper threshold amount and/or a decrease by at least a lower threshold amount. If necessary, the function of each pixel 111 regarding intensity and event detection may be divided and different pixels observing the same solid angle can implement the respective functions. These different pixels may be subpixels and can be implemented such that they share part of the circuitry. The different pixels may also be part of different image sensors. For the present disclosure, whenever it is referred to a pixel capable of generating an imaging signal and an event signal, this should be understood to include also a combination of pixels separately carrying out these functions as described above.

A controller 120 performs a flow control of the processes in the pixel array 110. For example, the controller 120 may control a threshold generation circuit 130 that determines and supplies thresholds to individual pixels 111 in the pixel array 110. A readout circuit 140 provides control signals for addressing individual pixels 111 and outputs information about the position of such pixels 111 that indicate an event. Since the solid-state imaging device 100 employs event-based change detection, the readout circuit 140 may output a variable amount of data per time unit. The readout circuit 140 corresponds to the readout circuitry 1011*b*.

Figure 13B:
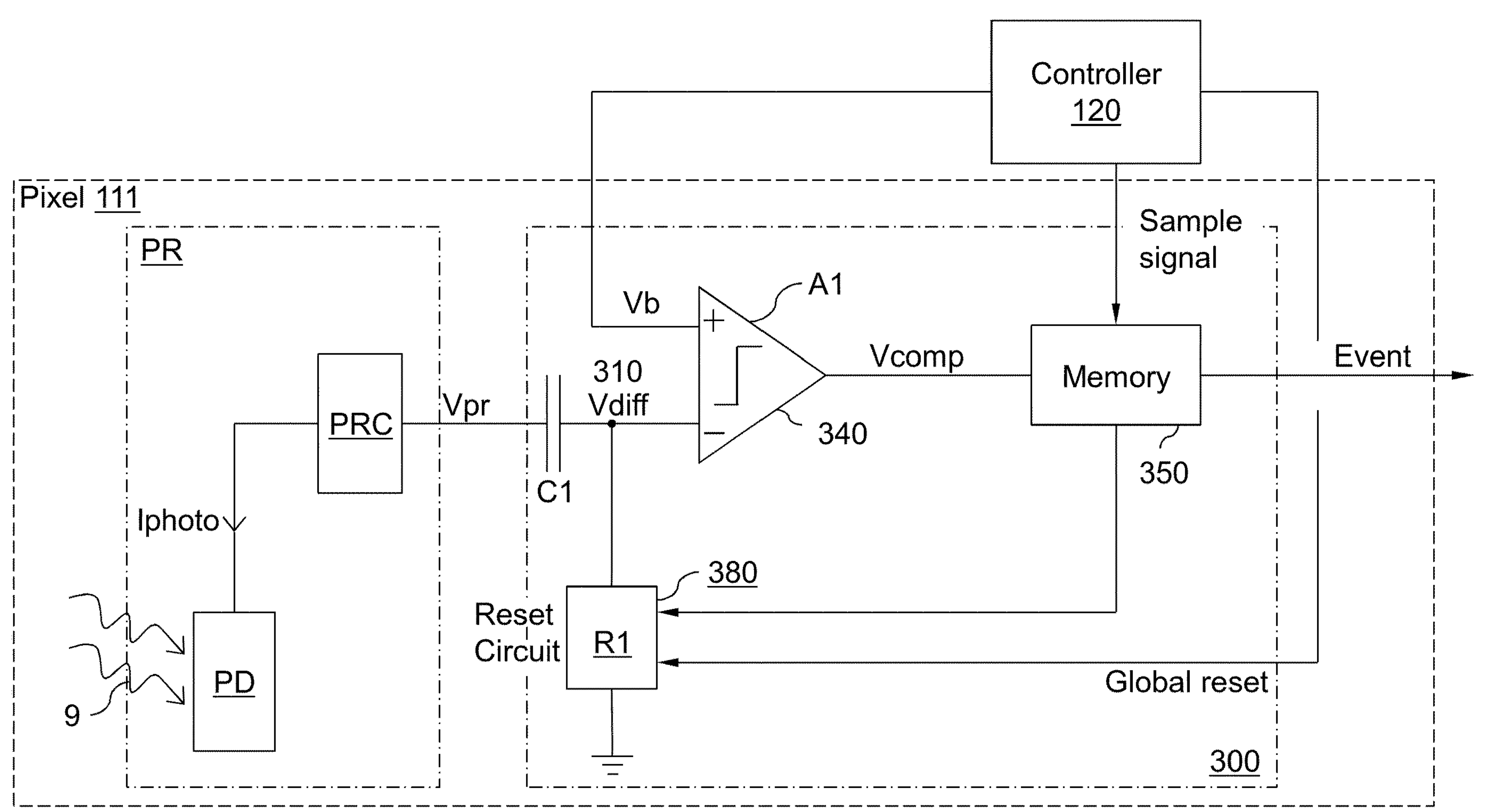
FIG. 13B is a simplified block diagram of the pixel array illustrated in FIG. 13A.

FIG. 13B shows exemplarily details of the imaging pixels 111 in FIG. 13A as far as their event detection capabilities are concerned. Of course, any other implementation that allows detection of events can be employed. Each pixel 111 includes a photoreceptor module PR and is assigned to a pixel back-end 300, wherein each complete pixel back-end 300 may be assigned to one single photoreceptor module PR. Alternatively, a pixel back-end 300 or parts thereof may be assigned to two or more photoreceptor modules PR, wherein the shared portion of the pixel back-end 300 may be sequentially connected to the assigned photoreceptor modules PR in a multiplexed manner.

The photoreceptor module PR includes a photoelectric conversion element PD, e.g. a photodiode or another type of photosensor. The photoelectric conversion element PD converts impinging light 9 into a photocurrent Iphoto through the photoelectric conversion element PD, wherein the amount of the photocurrent Iphoto is a function of the light intensity of the impinging light 9.

A photoreceptor circuit PRC converts the photocurrent Iphoto into a photoreceptor signal Vpr. The voltage of the photoreceptor signal Vpr is a function of the photocurrent Iphoto.

A memory capacitor 310 stores electric charge and holds a memory voltage which amount depends on a past photoreceptor signal Vpr. In particular, the memory capacitor 310 receives the photoreceptor signal Vpr such that a first electrode of the memory capacitor 310 carries a charge that is responsive to the photoreceptor signal Vpr and thus the light received by the photoelectric conversion element PD. A second electrode of the memory capacitor C1 is connected to the comparator node (inverting input) of a comparator circuit 340. Thus the voltage of the comparator node, Vdiff varies with changes in the photoreceptor signal Vpr.

The comparator circuit 340 compares the difference between the current photoreceptor signal Vpr and the past photoreceptor signal to a threshold. The comparator circuit 340 can be in each pixel back-end 300, or shared between a subset (for example a column) of pixels. According to an example each pixel 111 includes a pixel back-end 300 including a comparator circuit 340, such that the comparator circuit 340 is integral to the imaging pixel 111 and each imaging pixel 111 has a dedicated comparator circuit 340.

A memory element 350 stores the comparator output in response to a sample signal from the controller 120. The memory element 350 may include a sampling circuit (for example a switch and a parasitic or explicit capacitor) and/or a digital memory circuit such as a latch or a flip-flop). In one embodiment, the memory element 350 may be a sampling circuit. The memory element 350 may be configured to store one, two or more binary bits.

An output signal of a reset circuit 380 may set the inverting input of the comparator circuit 340 to a predefined potential. The output signal of the reset circuit 380 may be controlled in response to the content of the memory element 350 and/or in response to a global reset signal received from the controller 120.

The solid-state imaging device 100 is operated as follows: A change in light intensity of incident radiation 9 translates into a change of the photoreceptor signal Vpr. At times designated by the controller 120, the comparator circuit 340 compares Vdiff at the inverting input (comparator node) to a threshold Vb applied on its non-inverting input. At the same time, the controller 120 operates the memory element 350 to store the comparator output signal Vcomp. The memory element 350 may be located in either the pixel circuit 111 or in the readout circuit 140 shown in FIG. 13A.

If the state of the stored comparator output signal indicates a change in light intensity AND the global reset signal GlobalReset (controlled by the controller 120) is active, the conditional reset circuit 380 outputs a reset output signal that resets Vdiff to a known level.

The memory element 350 may include information indicating a change of the light intensity detected by the pixel 111 by more than a threshold value.

The solid state imaging device 120 may output the addresses (where the address of a pixel 111 corresponds to its row and column number) of those pixels 111 where a light intensity change has been detected. A detected light intensity change at a given pixel is called an event. More specifically, the term ‘event’ means that the photoreceptor signal representing and being a function of light intensity of a pixel has changed by an amount greater than or equal to a threshold applied by the controller through the threshold generation circuit 130. To transmit an event, the address of the corresponding pixel 111 is transmitted along with data indicating whether the light intensity change was positive or negative. The data indicating whether the light intensity change was positive or negative may include one single bit.

To detect light intensity changes between current and previous instances in time, each pixel 111 stores a representation of the light intensity at the previous instance in time.

More concretely, each pixel 111 stores a voltage Vdiff representing the difference between the photoreceptor signal at the time of the last event registered at the concerned pixel 111 and the current photoreceptor signal at this pixel 111.

To detect events, Vdiff at the comparator node may be first compared to a first threshold to detect an increase in light intensity (ON-event), and the comparator output is sampled on a (explicit or parasitic) capacitor or stored in a flip-flop. Then Vdiff at the comparator node is compared to a second threshold to detect a decrease in light intensity (OFF-event) and the comparator output is sampled on a (explicit or parasitic) capacitor or stored in a flip-flop.

The global reset signal is sent to all pixels 111, and in each pixel 111 this global reset signal is logically ANDed with the sampled comparator outputs to reset only those pixels where an event has been detected. Then the sampled comparator output voltages are read out, and the corresponding pixel addresses sent to a data receiving device.

FIG. 13C illustrates a configuration example of the solid-state imaging device 100 including an image sensor assembly 10 that is used for readout of intensity imaging signals in form of an active pixel sensor, APS. Here, FIG. 13C is purely exemplary. Readout of imaging signals can also be implemented in any other known manner. As stated above, the image sensor assembly 10 may use the same pixels 111 or may supplement these pixels 111 with additional pixels observing the respective same solid angles. In the following description the exemplary case of usage of the same pixel array 110 is chosen.

The image sensor assembly 10 includes the pixel array 110, an address decoder 12, a pixel timing driving unit 13, an ADC (analog-to-digital converter) 14, and a sensor controller 15.

The pixel array 110 includes a plurality of pixel circuits 11P arranged matrix-like in rows and columns. Each pixel circuit 11P includes a photosensitive element and FETs (field effect transistors) for controlling the signal output by the photosensitive element.

The address decoder 12 and the pixel timing driving unit 13 control driving of each pixel circuit 11P disposed in the pixel array 110. That is, the address decoder 12 supplies a control signal for designating the pixel circuit 11P to be driven or the like to the pixel timing driving unit 13 according to an address, a latch signal, and the like supplied from the sensor controller 15. The pixel timing driving unit 13 drives the FETs of the pixel circuit 11P according to driving timing signals supplied from the sensor controller 15 and the control signal supplied from the address decoder 12. The electric signals of the pixel circuits 11P (pixel output signals, imaging signals) are supplied through vertical signal lines VSL to ADCs 14, wherein each ADC 14 is connected to one of the vertical signal lines VSL, and wherein each vertical signal line VSL is connected to all pixel circuits 11P of one column of the pixel array unit 11. Each ADC 14 performs an analog-to-digital conversion on the pixel output signals successively output from the column of the pixel array unit 11 and outputs the digital pixel data DPXS to a signal processing unit. To this purpose, each ADC 14 includes a comparator 23, a digital-to-analog converter (DAC) 22 and a counter 24.

The sensor controller 15 controls the image sensor assembly 10. That is, for example, the sensor controller 15 supplies the address and the latch signal to the address decoder 12, and supplies the driving timing signal to the pixel timing driving unit 13. In addition, the sensor controller 15 may supply a control signal for controlling the ADC 14.

The pixel circuit 11P includes the photoelectric conversion element PD as the photosensitive element. The photoelectric conversion element PD may include or may be composed of, for example, a photodiode. With respect to one photoelectric conversion element PD, the pixel circuit 11P may have four FETs serving as active elements, i.e., a transfer transistor TG, a reset transistor RST, an amplification transistor AMP, and a selection transistor SEL.

The photoelectric conversion element PD photoelectrically converts incident light into electric charges (here, electrons). The amount of electric charge generated in the photoelectric conversion element PD corresponds to the amount of the incident light.

The transfer transistor TG is connected between the photoelectric conversion element PD and a floating diffusion region FD. The transfer transistor TG serves as a transfer element for transferring charge from the photoelectric conversion element PD to the floating diffusion region FD. The floating diffusion region FD serves as temporary local charge storage. A transfer signal serving as a control signal is supplied to the gate (transfer gate) of the transfer transistor TG through a transfer control line.

Thus, the transfer transistor TG may transfer electrons photoelectrically converted by the photoelectric conversion element PD to the floating diffusion FD.

The reset transistor RST is connected between the floating diffusion FD and a power supply line to which a positive supply voltage VDD is supplied. A reset signal serving as a control signal is supplied to the gate of the reset transistor RST through a reset control line.

Thus, the reset transistor RST serving as a reset element resets a potential of the floating diffusion FD to that of the power supply line.

The floating diffusion FD is connected to the gate of the amplification transistor AMP serving as an amplification element. That is, the floating diffusion FD functions as the input node of the amplification transistor AMP serving as an amplification element.

The amplification transistor AMP and the selection transistor SEL are connected in series between the power supply line VDD and a vertical signal line VSL.

Thus, the amplification transistor AMP is connected to the signal line VSL through the selection transistor SEL and constitutes a source-follower circuit with a constant current source 21 illustrated as part of the ADC 14.

Then, a selection signal serving as a control signal corresponding to an address signal is supplied to the gate of the selection transistor SEL through a selection control line, and the selection transistor SEL is turned on.

When the selection transistor SEL is turned on, the amplification transistor AMP amplifies the potential of the floating diffusion FD and outputs a voltage corresponding to the potential of the floating diffusion FD to the signal line VSL. The signal line VSL transfers the pixel output signal from the pixel circuit 11P to the ADC 14.

Since the respective gates of the transfer transistor TG, the reset transistor RST, and the selection transistor SEL are, for example, connected in units of rows, these operations are simultaneously performed for each of the pixel circuits 11P of one row. Further, it is also possible to selectively read out single pixels or pixel groups.

The ADC 14 may include a DAC 22, the constant current source 21 connected to the vertical signal line VSL, a comparator 23, and a counter 24.

The vertical signal line VSL, the constant current source 21 and the amplifier transistor AMP of the pixel circuit 11P combine to a source follower circuit.

The DAC 22 generates and outputs a reference signal. By performing digital-to-analog conversion of a digital signal increased in regular intervals, e.g. by one, the DAC 22 may generate a reference signal including a reference voltage ramp. Within the voltage ramp, the reference signal steadily increases per time unit. The increase may be linear or not linear.

The comparator 23 has two input terminals. The reference signal output from the DAC 22 is supplied to a first input terminal of the comparator 23 through a first capacitor C1. The pixel output signal transmitted through the vertical signal line VSL is supplied to the second input terminal of the comparator 23 through a second capacitor C2.

The comparator 23 compares the pixel output signal and the reference signal that are supplied to the two input terminals with each other, and outputs a comparator output signal representing the comparison result. That is, the comparator 23 outputs the comparator output signal representing the magnitude relationship between the pixel output signal and the reference signal. For example, the comparator output signal may have high level when the pixel output signal is higher than the reference signal and may have low level otherwise, or vice versa. The comparator output signal VCO is supplied to the counter 24.

The counter 24 counts a count value in synchronization with a predetermined clock. That is, the counter 24 starts the count of the count value from the start of a P phase or a D phase when the DAC 22 starts to decrease the reference signal, and counts the count value until the magnitude relationship between the pixel output signal and the reference signal changes and the comparator output signal is inverted. When the comparator output signal is inverted, the counter 24 stops the count of the count value and outputs the count value at that time as the AD conversion result (digital pixel data DPXS) of the pixel output signal.

Figure 14:
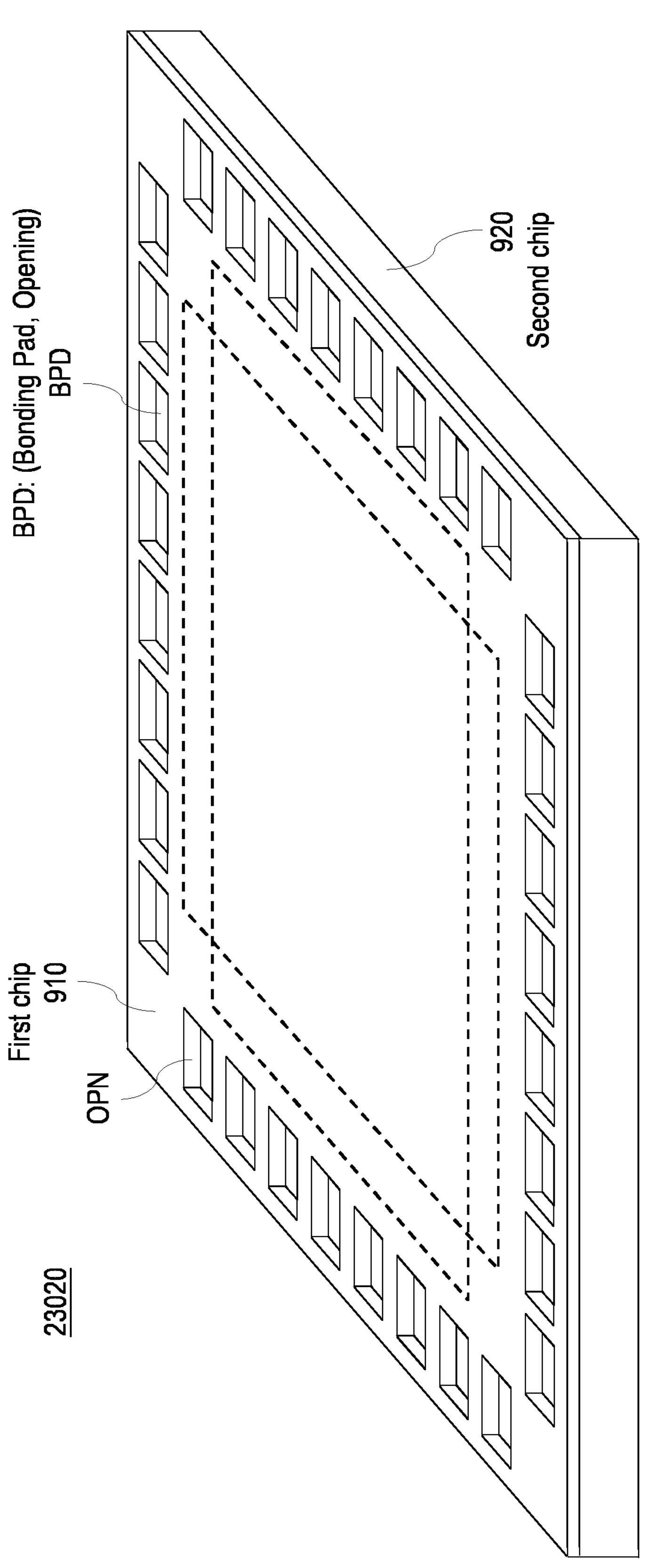
FIG. 14 is a simplified perspective view of a solid-state imaging device with laminated structure according to an embodiment of the present disclosure.

FIG. 14 is a perspective view showing an example of a laminated structure of a solid-state imaging device 23020 with a plurality of pixels arranged matrix-like in array form in which the functions described above may be implemented. Each pixel includes at least one photoelectric conversion element.

The solid-state imaging device 23020 has the laminated structure of a first chip (upper chip) 910 and a second chip (lower chip) 920.

The laminated first and second chips 910, 920 may be electrically connected to each other through TC(S)Vs (Through Contact (Silicon) Vias) formed in the first chip 910.

The solid-state imaging device 23020 may be formed to have the laminated structure in such a manner that the first and second chips 910 and 920 are bonded together at wafer level and cut out by dicing.

In the laminated structure of the upper and lower two chips, the first chip 910 may be an analog chip (sensor chip) including at least one analog component of each pixel, e.g., the photoelectric conversion elements arranged in array form. For example, the first chip 910 may include only the photoelectric conversion elements.

Alternatively, the first chip 910 may include further elements of each photoreceptor module. For example, the first chip 910 may include, in addition to the photoelectric conversion elements, at least some or all of the n-channel MOSFETs of the photoreceptor modules. Alternatively, the first chip 910 may include each element of the photoreceptor modules.

The first chip 910 may also include parts of the pixel back-ends 300. For example, the first chip 910 may include the memory capacitors, or, in addition to the memory capacitors sample/hold circuits and/or buffer circuits electrically connected between the memory capacitors and the event-detecting comparator circuits. Alternatively, the first chip 910 may include the complete pixel back-ends. With reference to FIG. 13A, the first chip 910 may also include at least portions of the readout circuit 140, the threshold generation circuit 130 and/or the controller 120 or the entire control unit.

The second chip 920 may be mainly a logic chip (digital chip) that includes the elements complementing the circuits on the first chip 910 to the solid-state imaging device 23020. The second chip 920 may also include analog circuits, for example circuits that quantize analog signals transferred from the first chip 910 through the TCVs.

The second chip 920 may have one or more bonding pads BPD and the first chip 910 may have openings OPN for use in wire-bonding to the second chip 920.

The solid-state imaging device 23020 with the laminated structure of the two chips 910, 920 may have the following characteristic configuration:

The electrical connection between the first chip 910 and the second chip 920 is performed through, for example, the TCVs. The TCVs may be arranged at chip ends or between a pad region and a circuit region. The TCVs for transmitting control signals and supplying power may be mainly concentrated at, for example, the four corners of the solid-state imaging device 23020, by which a signal wiring area of the first chip 910 can be reduced.

Typically, the first chip 910 includes a p-type substrate and formation of p-channel MOSFETs typically implies the formation of n-doped wells separating the p-type source and drain regions of the p-channel MOSFETs from each other and from further p-type regions. Avoiding the formation of p-channel MOSFETs may therefore simplify the manufacturing process of the first chip 910.

Figure 15:
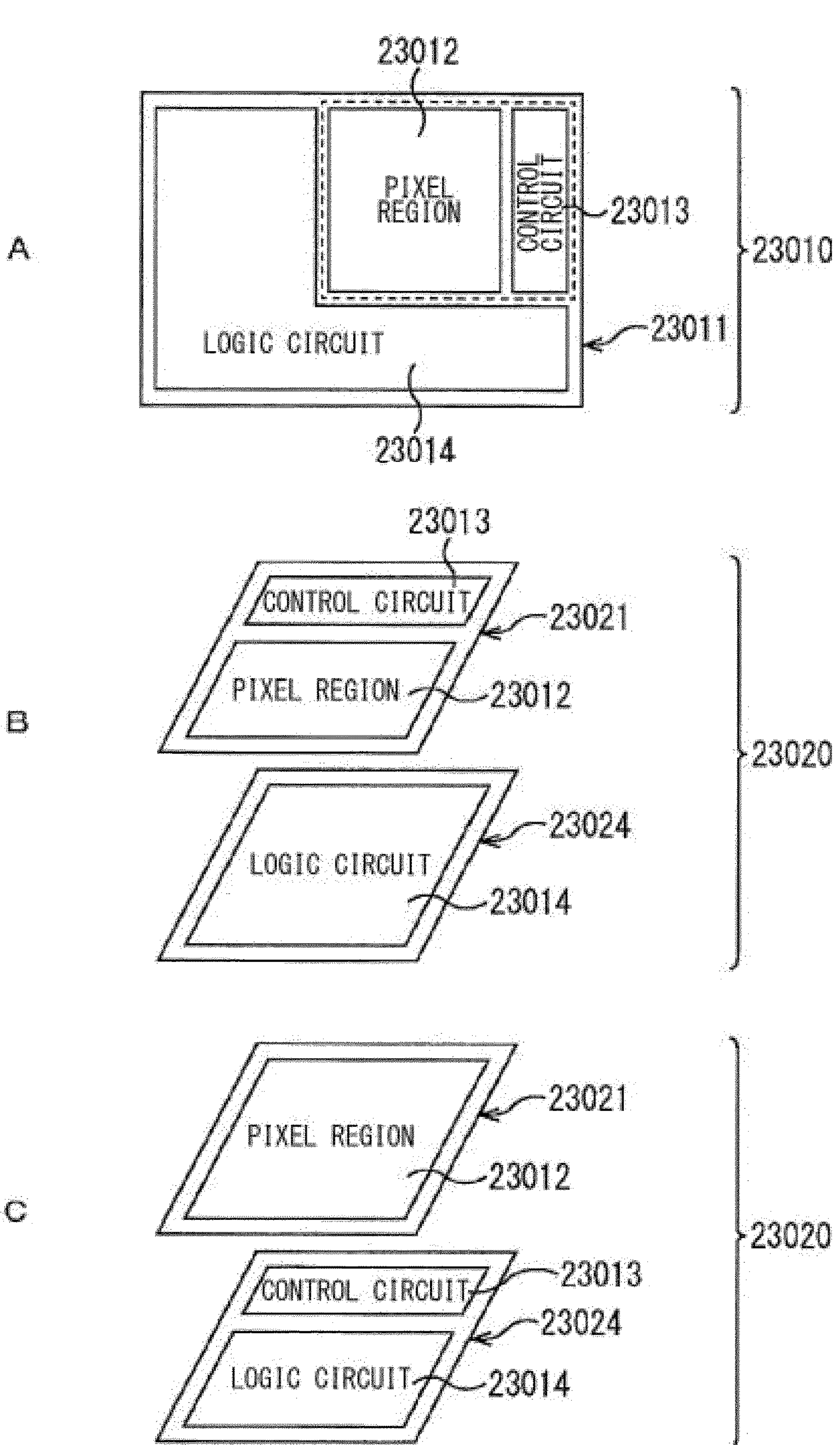
FIG. 15 illustrates simplified diagrams of configuration examples of a multi-layer solid-state imaging device to which a technology according to the present disclosure may be applied.

FIG. 15 illustrates schematic configuration examples of solid-state imaging devices 23010, 23020.

The single-layer solid-state imaging device 23010 illustrated in part A of FIG. 15 includes a single die (semiconductor substrate) 23011. Mounted and/or formed on the single die 23011 are a pixel region 23012 (photoelectric conversion elements), a control circuit 23013 (readout circuit, threshold generation circuit, controller, control unit), and a logic circuit 23014 (pixel back-end). In the pixel region 23012, pixels are disposed in an array form. The control circuit 23013 performs various kinds of control including control of driving the pixels. The logic circuit 23014 performs signal processing.

Parts B and C of FIG. 15 illustrate schematic configuration examples of multi-layer solid-state imaging devices 23020 with laminated structure. As illustrated in parts B and C of FIG. 15, two dies (chips), namely a sensor die 23021 (first chip) and a logic die 23024 (second chip), are stacked in a solid-state imaging device 23020. These dies are electrically connected to form a single semiconductor chip.

With reference to part B of FIG. 15, the pixel region 23012 and the control circuit 23013 are formed or mounted on the sensor die 23021, and the logic circuit 23014 is formed or mounted on the logic die 23024. The logic circuit 23014 may include at least parts of the pixel back-ends. The pixel region 23012 includes at least the photoelectric conversion elements.

With reference to part C of FIG. 15, the pixel region 23012 is formed or mounted on the sensor die 23021, whereas the control circuit 23013 and the logic circuit 23014 are formed or mounted on the logic die 23024.

According to another example (not illustrated), the pixel region 23012 and the logic circuit 23014, or the pixel region 23012 and parts of the logic circuit 23014 may be formed or mounted on the sensor die 23021, and the control circuit 23013 is formed or mounted on the logic die 23024.

Within a solid-state imaging device with a plurality of photoreceptor modules PR, all photoreceptor modules PR may operate in the same mode. Alternatively, a first subset of the photoreceptor modules PR may operate in a mode with low SNR and high temporal resolution and a second, complementary subset of the photoreceptor module may operate in a mode with high SNR and low temporal resolution. The control signal may also not be a function of illumination conditions but, e.g., of user settings.

<Application Example to Mobile Body>

The technology according to the present disclosure may be realized, e.g., as a device mounted in a mobile body of any type such as automobile, electric vehicle, hybrid electric vehicle, motorcycle, bicycle, personal mobility, airplane, drone, ship, or robot.

FIG. 16 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 16, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may be or may include a solid-state imaging sensor with event detection and photoreceptor modules according to the present disclosure. The imaging section 12031 may output the electric signal as position information identifying pixels having detected an event. The light received by the imaging section 12031 may be visible light, or may be invisible light such as infrared rays or the like.

The in-vehicle information detecting unit 12040 detects information about the inside of the vehicle and may be or may include a solid-state imaging sensor with event detection and photoreceptor modules according to the present disclosure. The in-vehicle information detecting unit 12040 is, for example, connected with a driver state detecting section 12041 that detects the state of a driver. The driver state detecting section 12041, for example, includes a camera focused on the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 16, an audio speaker 12061, a display section 12062, and an instrument panel 12063 are illustrated as the output device. The display section 12062 may, for example, include at least one of an on-board display or a head-up display.

Figure 17:
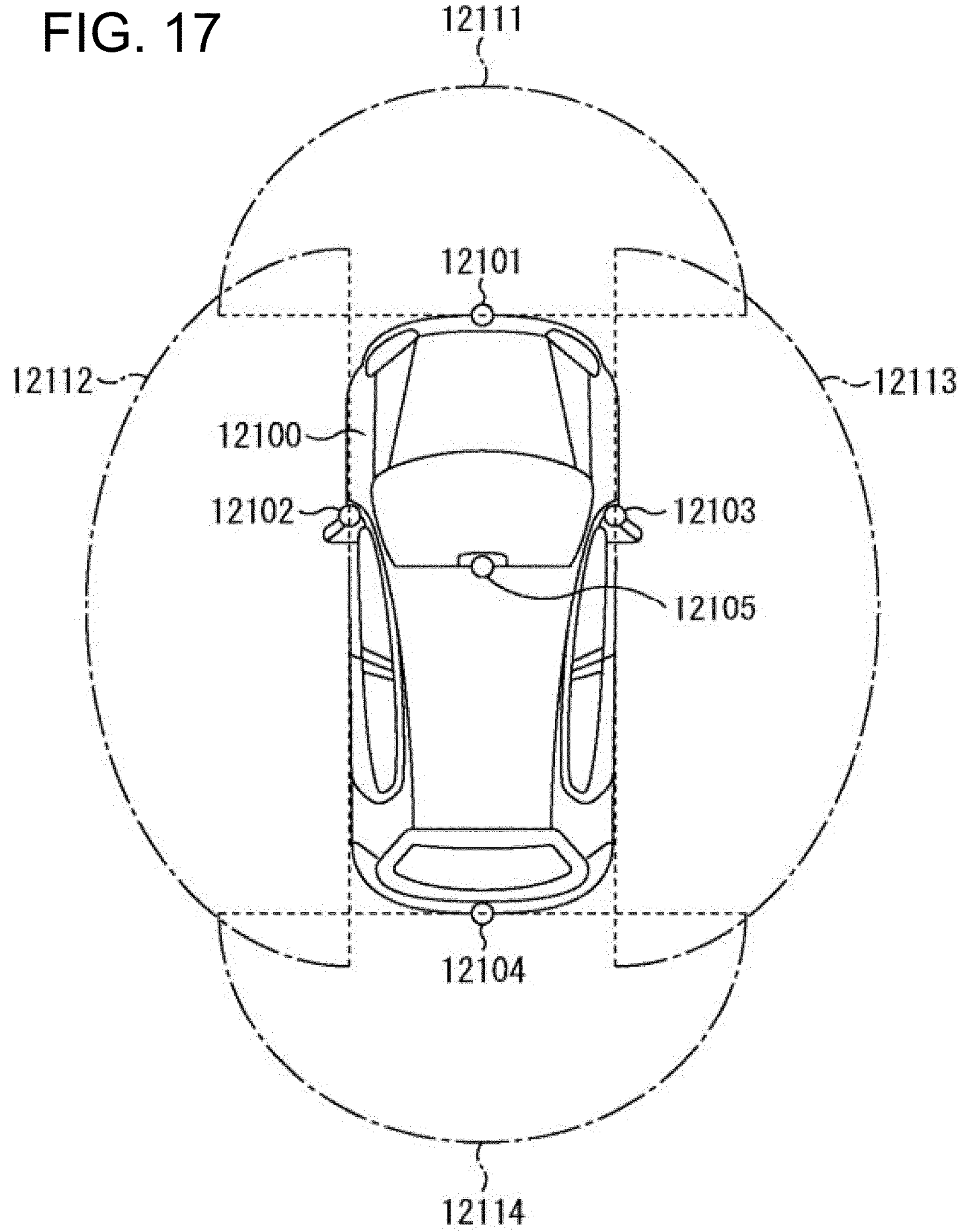
FIG. 17 is a diagram of assistance in explaining an example of installation positions of an outside-vehicle information detecting section and an imaging section of the vehicle control system of FIG. 16.

FIG. 17 is a diagram depicting an example of the installation position of the imaging section 12031, wherein the imaging section 12031 may include imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 17 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to the present disclosure is applicable has been described above. By applying the photoreceptor modules for obtaining event-triggered image information, the image data transmitted through the communication network may be reduced and it may be possible to reduce power consumption without adversely affecting driving support.

Additionally, embodiments of the present technology are not limited to the above-described embodiments, but various changes can be made within the scope of the present technology without departing from the gist of the present technology.

The solid-state imaging device according to the present disclosure may be any device used for analyzing and/or processing radiation such as visible light, infrared light, ultraviolet light, and X-rays. For example, the solid-state imaging device may be any electronic device in the field of traffic, the field of home appliances, the field of medical and healthcare, the field of security, the field of beauty, the field of sports, the field of agriculture, the field of image reproduction or the like.

Specifically, in the field of image reproduction, the solid-state imaging device may be a device for capturing an image to be provided for appreciation, such as a digital camera, a smart phone, or a mobile phone device having a camera function. In the field of traffic, for example, the solid-state imaging device may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the solid-state imaging device may be integrated in any type of sensor that can be used in devices provided for home appliances such as TV receivers, refrigerators, and air conditioners to capture gestures of users and perform device operations according to the gestures. Accordingly the solid-state imaging device may be integrated in home appliances such as TV receivers, refrigerators, and air conditioners and/or in devices controlling the home appliances. Furthermore, in the field of medical and healthcare, the solid-state imaging device may be integrated in any type of sensor, e.g. a solid-state image device, provided for use in medical and healthcare, such as an endoscope or a device that performs angiography by receiving infrared light.

In the field of security, the solid-state imaging device can be integrated in a device provided for use in security, such as a monitoring camera for crime prevention or a camera for person authentication use. Furthermore, in the field of beauty, the solid-state imaging device can be used in a device provided for use in beauty, such as a skin measuring instrument that captures skin or a microscope that captures a probe. In the field of sports, the solid-state imaging device can be integrated in a device provided for use in sports, such as an action camera or a wearable camera for sport use or the like. Furthermore, in the field of agriculture, the solid-state imaging device can be used in a device provided for use in agriculture, such as a camera for monitoring the condition of fields and crops.

Note that the present technology can also be configured as described below:

(1) A sensor device comprising a plurality of sensor units each of which being capable to detect an intensity of an influence on the sensor unit, and to detect as an event a positive or negative change of the intensity of the influence that is larger than a respective predetermined threshold;

a filter unit configured to randomly select for readout a part of the events that were detected by the plurality of sensor units during at least one predetermined time period;

a memory unit configured to store history data of detected events and/or of readout selection operations of the filter unit; and an output interface configured to receive and output the selected part of the events from the filter unit for each of the at least one predetermined time periods; wherein the filter unit is configured to perform the random selection repeatedly for a series of the at least one predetermined time periods based on the history data.

(2) The sensor device according to (1), wherein the plurality of sensor units, the filter unit, the memory unit, and the output interface are all part of a single sensor chip.

(3) The sensor device according to (1) or (2), wherein during each predetermined time period the memory unit is configured to store as the history data the events and the number of events detected during this predetermined time period;

the filter unit is configured to compare the stored number of events with an event selection threshold, to carry out the random selection on the events stored in the memory unit, when the stored number of events is larger than the event selection threshold, and to not carry out the random selection on the events stored in the memory unit, when the stored number of events is smaller than the event selection threshold.

(4) The sensor device according to (3), wherein the filter unit is configured to set a probability for forwarding an event out of the stored events to the output interface as the ratio of the event selection threshold and the stored number of events.

(5) The sensor device according to (4), wherein the filter unit is configured to carry out random selection of multiple events stored in the memory unit in parallel.

(6) The sensor device according to (3), wherein the filter unit is configured to carry out random selection by randomly choosing stored events for forwarding to the output interface without choosing the same stored event twice, by counting the number of forwarded events, and by stopping forwarding of stored events, when the number of forwarded events has reached the event selection threshold.

(7) The sensor device according to (1) or (2), wherein the memory unit has at least one memory space to store a number of N events at the same time;

for each predetermined time period the filter unit is configured to store each newly detected event into the memory space until the number of N events are stored therein, and to decide thereafter randomly whether or not to overwrite events stored in the memory space by newly detected events.

(8) The sensor device according to (7), wherein for randomly deciding whether or not to overwrite events stored in the memory space the filter unit is configured to count the number of detected events and to store the counted number in the memory unit as history data, to generate for each newly detected event a random number between 1 and the momentary number of detected events, to discard the newly detected event, if the random number is larger than the number N, and, if the random number is smaller or equal to N, to overwrite the event stored in the memory space at a position corresponding to the random number.

(9) The sensor device according to (1) or (2), wherein the memory unit is configured to store as the history data the number of events detected during the predetermined time periods; and the filter unit is configured to randomly select events during a current predetermined time period with a probability that depends on the number of detected events of the previous predetermined time period.

(10) The sensor device according to (1), wherein the sensor units are divided into groups of sensor units, each containing preferably the same number of sensor units; and the filter unit is configured to separately carry out random selection of the detected events for each group of sensor units.

(11) The sensor device according to (10), wherein the memory unit is configured to store as the history data the total number of events detected during the predetermined time periods as well as the number of events detected within each of the groups of sensor units; and the filter unit is configured to determine the probability for randomly selecting an event detected in one specific group in a current predetermined time period based on the total number of events and the number of events counted for the specific group in the previous predetermined time period.

(12) The sensor device according to (10) or (11), wherein the filter unit is configured to assign to each group of sensor units a desired number of events to be read out from the respective group, and to carry out random selection with a probability that is based on the assigned desired number.

(13) The sensor device according to any one of (1) to (12), wherein the filter unit is configured to carry out random selection by grouping all or a subset of events detected during one predetermined time period into an event vector and by performing a bit-wise logical operation between the event vector and a random vector containing a randomly distributed number of 1s and otherwise 0s.

(14) The sensor device according to any one of (1) to (13), wherein the sensor device is a solid state imaging device;

the sensor units are imaging pixels arranged in a pixel array, each of which being capable to sense intensity of light falling on the imaging pixel, and to detect as an event a positive or negative change of light intensity that is larger than the respective predetermined threshold.

(15) A method for operating a sensor device according to any one of (1) to (14), the method comprising detecting events with the plurality of sensor units;

randomly selecting for readout a part of the events that were detected by the plurality of sensor units during at least one predetermined time period;

storing history data of detected events and/or of readout selection operations;

outputting the selected part of the events for each of the at least one predetermined time periods; wherein the random selection is performed repeatedly for a series of the at least one predetermined time periods based on the history data.

The invention claimed is:

1. A sensor device comprising a plurality of sensors each of which is configured to detect an intensity of an influence on the sensor and to detect as an event a positive or a negative change of the intensity of the influence that is larger than a respective predetermined threshold;

processing circuitry configured to randomly select for readout a part of a plurality of events detected by the plurality of sensor during at least one predetermined time period;

a memory configured to store history data of detected events and/or of readout selection operations of the processing circuitry; and an output interface configured to receive and output the selected part of the plurality of events from the processing circuitry for each of the at least one predetermined time period, wherein the processing circuitry is configured to perform the random selection repeatedly for a series of the at least one predetermined time period including performing the random selection for a current predetermined time period based on the history data of detected events and/or of readout selection operations for a previous predetermined time period, the plurality of sensors, the processing circuitry, the memory, and the output interface are all part of a single sensor chip, during each predetermined time period the memory is configured to store as the history data events and a number of the events detected during the predetermined time period, the processing circuitry is configured to compare the stored number of events with an event selection threshold, when the stored number of events is larger than the event selection threshold, carry out the random selection on the events stored in the memory, and when the stored number of events is smaller than the event selection threshold, not carry out the random selection on the events stored in the memory, and the processing circuitry is configured to set a probability for forwarding an event out of the stored events to the output interface as a ratio of the event selection threshold and the stored number of events.

2. The sensor device according to claim 1, wherein the processing circuitry is configured to carry out random selection of multiple events stored in the memory in parallel.

3. The sensor device according to claim 1, wherein the processing circuitry is configured to carry out random selection by randomly choosing one or more event of the stored events for forwarding to the output interface without choosing a same stored event twice, counting a number of the forwarded events, and when the number of forwarded events has reached the event selection threshold, stopping forwarding of the stored events.

4. The sensor device according to claim 1, wherein the memory has at least one memory space to store a number of N events at a same time; and for each predetermined time period the processing circuitry is configured to store each newly detected event into the memory space until the number of N events are stored therein, and decide thereafter randomly whether or not to overwrite events stored in the memory space by newly detected events.

5. The sensor device according to claim 4, wherein for randomly deciding whether or not to overwrite the events stored in the memory space the processing circuitry is configured to:

count a number of detected events, store the counted number in the memory as the history data, generate for each of the newly detected events a random number between 1 and a momentary number of detected events, if the random number is larger than the number N, discard the newly detected event, and if the random number is smaller or equal to N, overwrite an event stored in the memory space at a position corresponding to the random number.

6. The sensor device according to claim 1, wherein the memory is configured to store as the history data a number of events detected during the at least one predetermined time period; and the processing circuitry is configured to randomly select events during the current predetermined time period with a probability that depends on a number of detected events of the previous predetermined time period.

7. The sensor device according to claim 1, wherein the plurality of sensor are divided into groups of sensor, each containing a same number of sensor; and the processing circuitry is configured to separately carry out the random selection of the detected events for each of the groups of sensor.

8. The sensor device according to claim 7, wherein the memory is configured to store as the history data a total number of events detected during the at least one predetermined time period as well as a number of events detected within each of the groups of sensor; and the processing circuitry is configured to determine a probability for randomly selecting an event detected in one specific group of the groups of sensors in the current predetermined time period based on the total number of events and the number of events counted for the specific group in the previous predetermined time period.

9. The sensor device according to claim 7, wherein the processing circuitry is configured to:

assign to each of the groups of sensor a desired number of events to be read out from the respective group, and carry out the random selection with a probability that is based on the assigned desired number.

10. The sensor device according to claim 1, wherein the processing circuitry is configured to carry out the random selection by:

grouping all or a subset of events detected during one predetermined time period into an event vector, and performing a bit-wise logical operation between the event vector and a random vector containing a randomly distributed number of 1s and otherwise 0s.

11. The sensor device according to claim 1, wherein the sensor device is a solid state imaging device; and the plurality of sensor are imaging pixels arranged in a pixel array, each of which is configured to sense intensity of light falling on the imaging pixel and to detect as the event a positive or a negative change of light intensity that is larger than the respective predetermined threshold.

12. A method for operating a sensor device according to claim 1, the method comprising:

detecting the plurality of events with the plurality of sensor;

randomly selecting for readout the part of the plurality of events detected by the plurality of sensor during the at least one predetermined time period;

storing history data of detected events and/or of readout selection operations; and outputting the selected part of the plurality of events for each of the at least one predetermined time period; wherein the random selection is performed repeatedly for a series of the at least one predetermined time period including performing the random selection for a current predetermined time period based on the history data of detected events and/or of readout selection operations for a previous predetermined time period.

13. A method comprising:

detecting a plurality of events with a plurality of sensors each of which is configured to detect an intensity of an influence on the sensor and to detect as an event a positive or a negative change of the intensity of the influence that is larger than a respective predetermined threshold;

randomly selecting for readout a part of the plurality of events detected by the plurality of sensors during at least one predetermined time period;

storing history data of detected events and/or of readout selection operations; and outputting the selected part of the plurality of events for each of the at least one predetermined time period; wherein the random selection is performed repeatedly for a series of the at least one predetermined time period including performing the random selection for a current predetermined time period based on the history data of detected events and/or of readout selection operations for a previous predetermined time period.

14. A method comprising:

detecting a plurality of events;

randomly selecting for readout a part of the plurality of events during at least one predetermined time period;

storing history data of detected events and/or of readout selection operations; and outputting the selected part of the plurality of events for each of the at least one predetermined time period; wherein the random selection is performed repeatedly for a series of the at least one predetermined time period including performing the random selection for a current predetermined time period based on the history data of detected events and/or of readout selection operations for a previous predetermined time period.

* * * * *